(12) United States Patent
Jung et al.

(10) Patent No.: US 12,493,434 B2
(45) Date of Patent: Dec. 9, 2025

(54) MEMORY DEVICES THAT SUPPORT SELECTIVE SETTING DATA UPDATE AND METHODS OF OPERATING SAME

(71) Applicant: Samsung Electronics Co., Ltd., Suwon-si (KR)

(72) Inventors: Keeho Jung, Suwon-si (KR); Suchang Jeon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 121 days.

(21) Appl. No.: 18/469,931

(22) Filed: Sep. 19, 2023

(65) Prior Publication Data
US 2024/0231697 A1 Jul. 11, 2024

(30) Foreign Application Priority Data

Jan. 11, 2023 (KR) .................. 10-2023-0004322
Apr. 26, 2023 (KR) .................. 10-2023-0054971

(51) Int. Cl.
*G06F 11/00* (2006.01)
*G06F 3/06* (2006.01)

(52) U.S. Cl.
CPC .......... *G06F 3/0659* (2013.01); *G06F 3/0607* (2013.01); *G06F 3/0653* (2013.01); *G06F 3/0679* (2013.01)

(58) Field of Classification Search
CPC ............. G06F 11/0727; G06F 11/2284; G06F 11/1402; G06F 11/1417; G06F 11/1438; G06F 11/1441
See application file for complete search history.

(56) References Cited

U.S. PATENT DOCUMENTS

| 7,019,417 | B2 | 3/2006 | Kang |
| 8,270,228 | B2 | 9/2012 | Mizukane et al. |
| 10,490,241 | B2 | 11/2019 | Penney et al. |
| 2016/0336077 | A1 | 11/2016 | Noh |

(Continued)

FOREIGN PATENT DOCUMENTS

| JP | 2015082330 A | 4/2015 |
| KR | 100427034 B1 | 4/2004 |

*Primary Examiner* — Philip Guyton
(74) *Attorney, Agent, or Firm* — Wolf, Greenfield & Sacks, P.C.

(57) ABSTRACT

A memory device includes a memory cell array having a plurality of cell blocks therein, including at least one cell block configured to store information data read (IDR) data related to setting an operating environment of the memory device. A setting data storage circuit is provided, which includes a plurality of storage regions in which the IDR data, which is read from the at least one cell block, is stored and a reset operation is independently controlled. Control logic is provided, which is configured to control at least one of a reset operation on the setting data storage circuit, and an IDR operation of updating the IDR data to the setting data storage circuit according to a decoding result of an external command. The control logic is configured to selectively reset only some storage regions of the setting data storage circuit in response to a determination that the external command is a first reset command, but reset all storage regions of the setting data storage circuit in response to a determination that the external command is a second reset command.

20 Claims, 19 Drawing Sheets

(56) References Cited

U.S. PATENT DOCUMENTS

2019/0073134 A1\* 3/2019 Shen ............... G06F 3/0617
2020/0167227 A1\* 5/2020 Her ................ G06F 11/165
2022/0051740 A1  2/2022 Sudo \* cited by examiner

FIG. 4

| # | Info Category | Super Reset ALL Command | Super Reset w/o IO Command | IDR ALL Command | IDR w/o IO Command |
|---|---|---|---|---|---|
| 1 | INFO OTHER THAN IO INTERFACE SETTING (OPTIMIZATION OF DC TRIM, BB, CR, CORE) | Reset | Reset | IDR Data Update | IDR Data Update |
| 2 | INFO RELATED TO IO INTERFACE SETTING (ODT, Driver Strength, ZQ Cal, DCC Training) | Reset | EXISTING SETTING DATA IS MAINTAINED | IDR Data Update | EXISTING SETTING DATA IS MAINTAINED |

| | Info_chip |
|---|---|
| NAND 1 | Info_IO/PWR/Pin Reset × |
| NAND 2 | Info_IO/PWR Reset × |
| NAND 3 | Info_IO/Pin Reset × |
| NAND 4 | Info_IO Reset × |

MEMORY DEVICES THAT SUPPORT SELECTIVE SETTING DATA UPDATE AND METHODS OF OPERATING SAME

REFERENCE TO PRIORITY APPLICATIONS

This application claims priority under 35 USC § 119 to Korean Patent Application Nos. 10-2023-0004322, filed Jan. 11, 2023, and 10-2023-0054971, filed Apr. 26, 2023, the disclosures of which are hereby incorporated herein by reference.

BACKGROUND

The inventive concept relates to memory devices and, more particularly, to memory devices that perform setting data updates and methods of operating same.

A memory device, such as a nonvolatile memory device, includes a plurality of memory cells configured to store data in a nonvolatile manner. As an example of a nonvolatile memory device, a flash memory device may be used in mobile phones, digital cameras, personal digital assistants (PDAs), mobile computer devices, stationary computer devices, and other various types of devices.

In relation to setting and operating an operating environment of a memory device, setting data (e.g., information data read (IDR) data) may be stored in the memory device in a nonvolatile manner. As an example, in a flash memory device, IDR data may be stored in memory cells, and when the flash memory device is initially driven, the IDR data may be loaded to a storage circuit (e.g., volatile or nonvolatile memory), such as a static random-access memory (SRAM), dynamic random-access memory (DRAM), a latch circuit, etc.

In some situations, a memory device may have an error in IDR data stored in a storage circuit due to various causes, and an operating environment of the memory device needs to reset through a reset process including a reset operation on the storage circuit. However, because the resetting process can take a relatively long time, and because a flash memory device may include a plurality of memory chips, a memory chip having an error typically cannot be selectively reset to thereby reduce a duration of the resetting process.

SUMMARY

The inventive concept provides a memory device capable of efficiently removing a soft error or an uncorrectable error, and an operating method thereof.

According to an aspect of the inventive concept, there is provided a memory device including a memory cell array, which is divided into a plurality of cell blocks. At least one of these cell blocks stores information data read (IDR) data related to setting an operating environment of the memory device. A setting data storage circuit is provided, which includes a plurality of storage regions in which the IDR data, which is read from the at least one cell block, is stored and a reset operation is independently controlled. Control logic is provided, which is configured to control at least one of a reset operation on the setting data storage circuit, and an IDR operation of updating the IDR data to the setting data storage circuit according to a decoding result of an external command. The control logic is configured to selectively reset only some storage regions of the setting data storage circuit in response to a determination that the external command is a first reset command, but reset all storage regions of the setting data storage circuit in response to a determination that the external command is a second reset command.

BRIEF DESCRIPTION OF THE DRAWINGS

Embodiments will be more clearly understood from the following detailed description taken in conjunction with the accompanying drawings in which:

FIG. 4 is a table illustrating examples of IDR data classification and resetting operations according to the embodiments described above;

FIGS. 15A and 15B are diagrams illustrating various examples of performing a reset and update operation on a plurality of NAND chips.

DETAILED DESCRIPTION OF THE EMBODIMENTS

Hereinafter, embodiments are described in detail with reference to the accompanying drawings.

Figure 1:
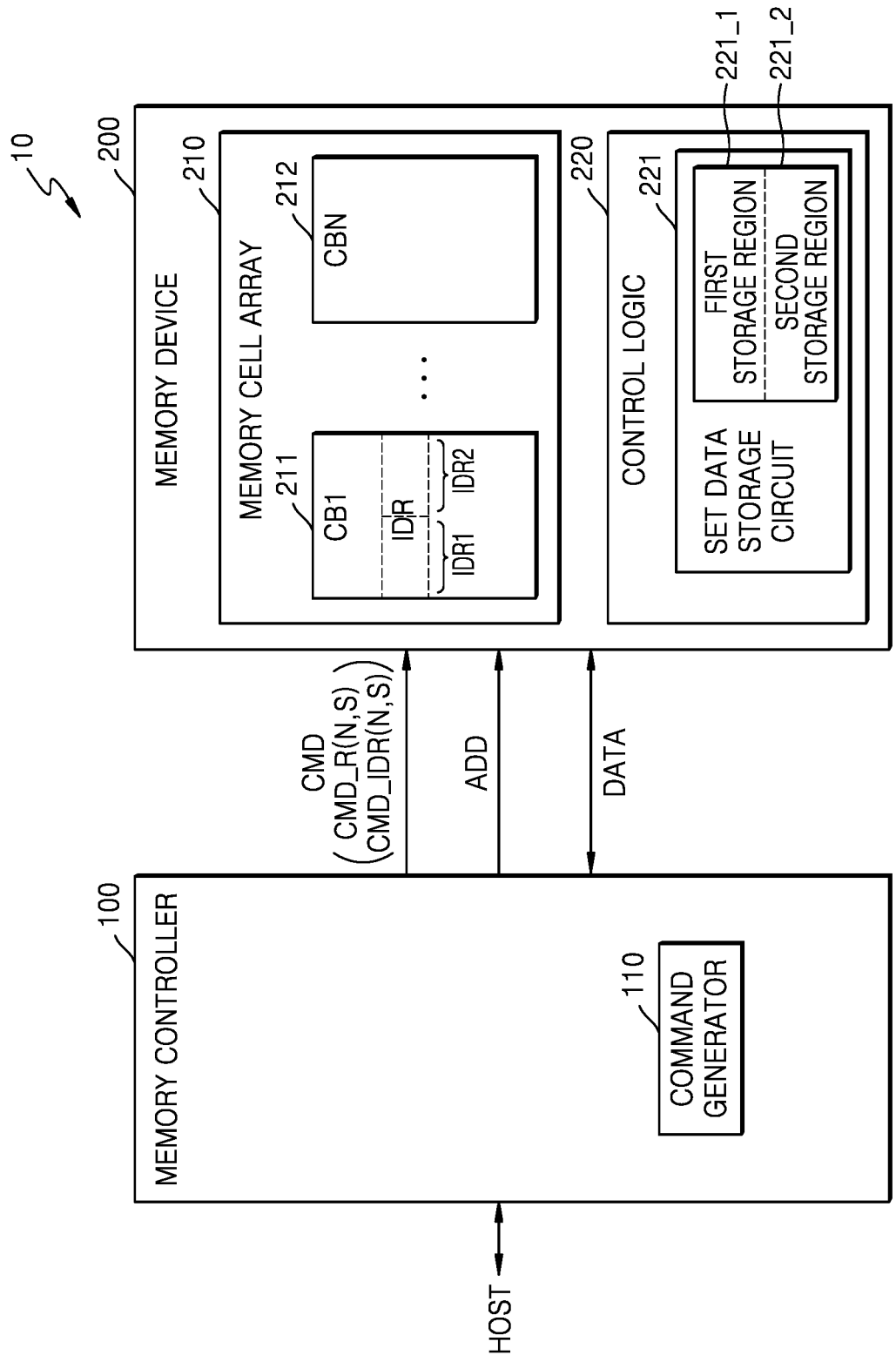
FIG. 1 is a block diagram illustrating a memory system according to an embodiment.

FIG. 1 is a block diagram illustrating a memory system 10 according to an embodiment, which may include a memory controller 100 and a memory device 200, and the memory device 200 may include a memory cell array 210 and control logic 220. Although not shown in FIG. 1, the memory device 200 may further include a voltage generator, which is configured to generate various voltages related to program/read/erase of data, a page buffer connected to the memory cell array 210 through bit lines, and various other components.

According to an embodiment, the memory device 200 may include a nonvolatile memory device. As an example, the memory device 200 may include a nonvolatile memory device, such as a NAND flash memory, a vertical NAND flash memory, a NOR flash memory, a resistive random access memory, a phase-change memory, a magnetoresistive random access memory, and the like. In some embodiments, the memory device 200 or the memory system 10 may include a single memory chip or a multi-chip package in which two or more memory chips are mounted. Also, the memory device 200 or the memory system 10 may be implemented as an embedded memory built in an electronic device or as an external memory removable from an electronic device. As an example, the memory device 200 or the memory system 10 may be implemented in various forms, such as an embedded universal flash storage (UFS) memory device, an embedded multi-media card (eMMC), an SSD, a UFS memory card, a compact flash (CF) memory device, a secure digital (SD), a micro-SD memory/card, a mini-SD memory/card, an extreme digital (xD) V, a memory stick, and the like.

The memory controller 100 may control the memory device 200 to read data stored therein or write (or program) data into the memory device 200 in response to a write/read request issued from a host HOST. In an embodiment, the memory controller 100 may control program, read, and erase operations on the memory device 200 by providing an address ADD and a command CMD to the memory device 200. Also, data DATA to be written to the memory device 200 and data DATA read from the memory device 200 may be transmitted and received between the memory controller 100 and the memory device 200.

The memory cell array 210 may include a plurality of cell blocks CB1 to CBN. The cell blocks CB1 to CBN may store various types of data. For example, the cell blocks CB1 to CBN may include one or more cell blocks storing user data, and one or more cell blocks storing various types of information other than the user data. In an example when a first cell block 211 stores data other than the user data, the first cell block 211 may store setting data, such as information data read (IDR) data, in some embodiments. In the following embodiments, the IDR data is described as corresponding to setting data, but the embodiments are not limited thereto. In embodiments, various types of meta data other than the user data may be included in the setting data in relation to the operation of the memory device 200, and the IDR data may be defined as including at least a portion of the setting data.

According to an embodiment, the control logic 220 may include a setting data storage circuit 221. For example, the setting data storage circuit 221 may include a dynamic random-access memory (DRAM) cell, a static random-access memory (SRAM) cell, a fuse circuit, or an anti-fuse circuit, and may store the IDR data in a volatile or nonvolatile manner. In an embodiment, when the memory device 200 is initially driven (e.g., powered on), the IDR data read from the memory cell array 210 may be stored in the setting data storage circuit 221. The IDR data, as information stored during a manufacturing process of the memory system 10 or the memory device 200, may include input/output (I/O) setting information, pin setting information, power setting information, DC information, and option information, repair information, and bad block information necessary for initialization of the memory system 10.

According to an embodiment, the IDR data may be classified into at least two groups, and as an example. For example, the IDR data may include first IDR data DR 1 of a first group and second IDR data IDR 2 of a second group. In addition, when the IDR data is stored in any one row (or any one page) of the first cell block 211, the first IDR data IDR 1 and the second IDR data IDR 2 may be stored in column regions that are different from each other. Accordingly, in reading the IDR data stored in the first cell block 211, the first IDR data IDR 1 and the second IDR data IDR 2 may be separately read out based on a column address that operates to select a read position (e.g., group of selected columns).

The setting data storage circuit 221 may include a plurality of storage regions. In an embodiment, multiple storage regions of the setting data storage circuit 221 may correspond to multiple groups of the IDR data. For example, a first storage region 221_1 may correspond to the first IDR data IDR 1 and a second storage region 221_2 may correspond to the second IDR data IDR 2. When the memory device 200 is initially driven, the first IDR data IDR 1 read from the first cell block 211 may be loaded to the first storage region 221_1 and the second IDR data IDR 2 may be loaded to the second storage region 221_2.

The memory controller 100 may control a resetting operation on the memory device 200 based on a certain determination. The resetting operation may include a reset operation on at least some storage regions of the setting data storage circuit 221 and an IDR operation of reading at least a portion of IDR data from the first cell block 211 and updating the read IDR data to the setting data storage circuit 221. Alternatively, according to an embodiment, the resetting operation may include only one of a reset operation on the setting data storage circuit 221 and an update operation of updating IDR data.

According to embodiments, in the resetting operation, an update operation may be selectively performed only on the first IDR data IDR 1 among IDR data, whereas an update operation may not be performed on the second IDR data IDR 2 and an existing setting value may be maintained in the setting data storage circuit 221. As an example, the second IDR data IDR 2 may include I/O setting information related to an I/O interface between the memory controller 100 and the memory device 200, and the I/O setting information may not be updated during a resetting operation and the existing setting value may be maintained in the second storage region 221_2.

The I/O setting information may be an optimal setting value related to the I/O interface calculated through a training process between the memory controller 100 and the memory device 200 in the initial driving process of the memory device 200, and when the I/O setting information is initialized, the training process described above has to be newly performed, for which a long time and a large amount of resources may be required. According to embodiments, only the first storage region 221_1 as part of the setting data storage circuit 221 may be selectively reset, the first IDR data IDR 1 may be selectively read from the first cell block 211, and the read first IDR data IDR 1 may be updated in the first storage region 221_1.

The above resetting operation may be controlled by the command CMD from the memory controller 100. As an example, in relation to the resetting operation, the reset operation may be performed in response to a reset command CMD_R from the memory controller 100, and an IDR data read and update operation may be performed in response to an IDR command CMD_IDR from the memory controller 100.

Moreover, various types of commands may be defined in relation to embodiments, and a command generator 110 of the memory controller 100 may determine whether to perform a resetting operation on the entire IDR data, or whether to perform a resetting operation on only a portion of the IDR data, and may output a corresponding command. For example, when the command generator 110 outputs the normal reset command CMD_R(N), all storage regions of the setting data storage circuit 221 of the memory device 200 may be reset. In contrast, when the command generator 110 outputs a selective reset command CMD_R(S), only some storage regions of the setting data storage circuit 221 of the memory device 200 may be selectively reset. In addition, when the command generator 110 outputs the normal IDR command CMD_IDR(N), all IDR data may be read from the first cell block 211 and updated in the setting data storage circuit 221. When the command generator 110 outputs the selected IDR command CMD_IDR(S), the first IDR data IDR 1 may be selectively read from the first cell block 211 and updated to the first storage region 221_1 of the setting data storage circuit 221.

According to the resetting operation of the inventive concept as described above, the IDR data, other than the I/O setting information, may be selectively updated in relation to the operating environment of the memory device 200. Accordingly, when an error, such as a soft error or the like, occurs in the IDR data other than the I/O setting information, the error may be removed through the resetting operation described above. That is, communication between the memory controller 100 and the memory device 200 for a resetting operation may be performed based on previously set I/O setting information, and resources and time required for a resetting operation to remove an error may be reduced.

In the foregoing embodiment, although it is described that the IDR data, which is not updated in the resetting operation, includes one group, the memory system 10 may be implemented such that IDR data of a larger number of groups is not updated during the resetting operation according to types of the IDR data (e.g., different features in relation to setting of an operating environment). In this case, a larger number of reset commands and/or IDR commands may be defined in relation to the resetting operation, storage regions in which stored information is maintained in the setting data storage circuit may be selected according to types of commands provided from the memory controller 100, and some of the IDR data to be updated may be selected from the IDR data.

In the embodiment described above, the I/O setting information is used as an example of the second IDR data IDR 2, but according to embodiments, the first IDR data IDR 1 and the second IDR data IDR 2 may be classified based on various criteria. As an example, some of the read IDR data may be stored in the setting data storage circuit 221 without being changed in value, while the others thereof may be changed in value through the initial driving process (e.g., the training process) of the memory device 200 and stored in the setting data storage circuit 221. In an embodiment, the IDR data change in value through the training process, among the IDR data, may be defined as the second IDR data IDR 2 mentioned above, which is not updated during the resetting operation.

After the resetting operation according to the inventive concept is completed, the memory controller 100 may determine whether the memory device 200 operates normally, and an error, such as a soft error or the like occurring in information other than the I/O setting information, among the IDR data, may be removed by the update operation described above. If the memory device 200 does not operate normally even after the resetting operation, and the error, such as a soft error, is an error occurring in the I/O setting information, the entire resetting operation of updating the entire IDR data again may be performed under the control by the memory controller 100.

In addition, the reset operation and the update operation applicable to the above embodiments may be defined or described by various terms. As an example, an operation of resetting all storage regions of the setting data storage circuit 221 may be referred to as a super reset and an operation of selectively resetting only some storage regions (i.e., a reduced number, not all) may be referred to as a partial reset (or partial super reset). In addition, an operation of reading and updating all IDR data may be referred to as an all IDR update and an operation of selectively reading and updating some of the IDR data may be referred to as partial IDR update.

In addition, in the foregoing embodiment, it is described that the reset operation and the IDR operation are performed in response to reception of separate commands, but the embodiments are not limited thereto. For example, when a command for super reset is received by the memory device 200, the memory device 200 may serially perform a reset operation for the setting data storage circuit 221 and an operation of updating all IDR data in series. When a command for partial reset is received by the memory device 200, the memory device 200 may perform a reset operation of some storage regions and an update operation of some of the IDR data.

In addition, in the embodiment shown in FIG. 1, as an example, it is described that IDR data, which is not changed in value during the training process, corresponds to the first IDR data, but the embodiments are not limited thereto. As an example, among IDR data changed in value through the training process in the memory device 200, when normal communication is performed between the memory controller 100 and the memory device 200 even if the value of the IDR data is reset, the IDR data may be defined as the first IDR data. In addition, in the embodiment shown in FIG. 1, updating the first IDR data in the setting data storage circuit 221 may mean that at least a portion of the read first IDR data is changed through a training process and stored in the setting data storage circuit 221.

Although not shown in FIG. 1, the memory controller 100 may control the reset operation and the update operation according to embodiments based on hardware, software, or a combination thereof. For example, the memory controller 100 may include a processor and an operating memory (not shown), and the processor may control the resetting operation according to embodiments by executing a command stored in the operating memory.

Figure 2:
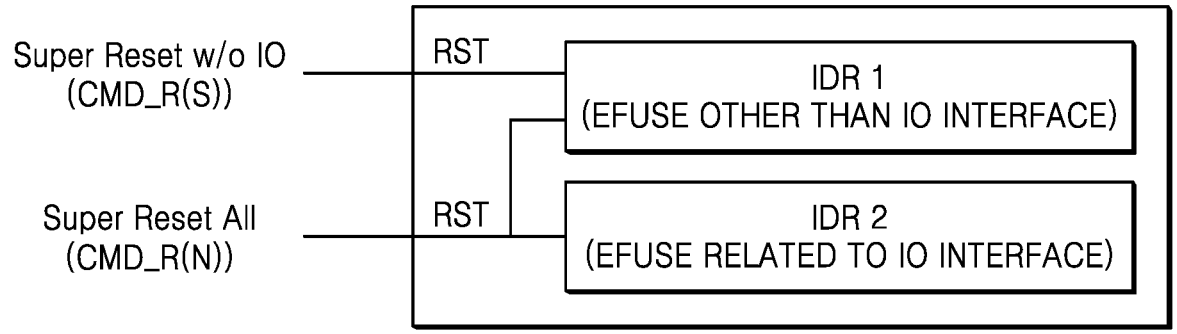
FIG. 2 is a block diagram illustrating an implementation example of a setting data storage circuit of FIG. 1.

FIG. 2 is a block diagram illustrating an implementation example of the setting data storage circuit 221 of FIG. 1. Referring to FIGS. 1 and 2, the setting data storage circuit 221 may include a plurality of storage elements (e.g., Efuse), and the storage elements may be classified into a plurality of storage regions. For example, the setting data storage circuit 221 may include a first storage region 221_1 storing the first group of first IDR data IDR 1 described above, among the IDR data, and a second storage region 221_2 storing the second group of second IDR data described above. As an example, the first IDR data IDR 1 may include various types of information related to setting of an operating environment, such as bad block information and core information provided in the memory device 200, as various types of information unrelated to an I/O interface. In addition, the second IDR data IDR 2 may include I/O setting information, and in addition, may include pin setting information, power setting information, and various other types of information, as various types of information related to communication between the memory controller 100 and the memory device 200.

The memory device 200 may reset the IDR information stored in the setting data storage circuit 221 in units of storage regions in response to a command from the memory controller 100. As an example, paths for transmitting a reset control signal RST to a plurality of storage regions included in the setting data storage circuit 221 may be physically or electrically separated from each other.

When a normal reset command (CMD_R(N) or super reset command) is provided to the memory device 200, the memory device 200 may generate a reset control signal RST for resetting all storage regions of the data storage circuit 221. In an embodiment, a command decoder (not shown) in the memory device 200 may decode the normal reset command CMD_R(N) and control a transfer path of the reset control signal RST so that the reset control signal RST may be provided to the first storage region 221_1 and the second storage region 221_2 according to a decoding result.

When a selective reset command (CMD_R(S) or some reset commands) is provided to the memory device 200, the command decoder (not shown) in the memory device 200 may decode the selective reset command CMD_R(S) and control a transfer path of the reset control signal RST so that the reset control signal RST may be selectively provided to the first storage region 221_1 according to a decoding result. Accordingly, the IDR data related to I/O setting information previously stored in the second storage region 221_2 may be maintained in the setting data storage circuit 221.

Figure 3:
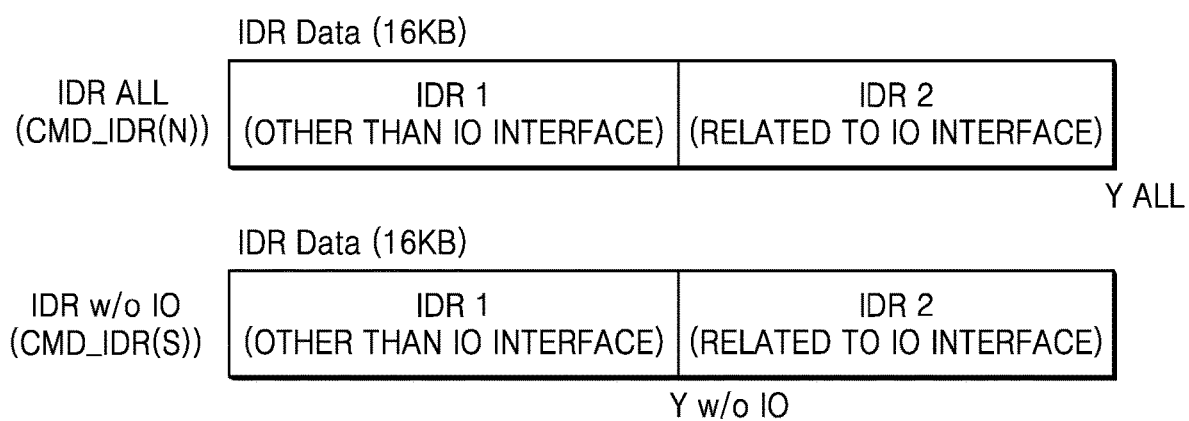
FIG. 3 is a block diagram illustrating an example of information data read (IDR) data stored in a first cell block of FIG. 1.

FIG. 3 is a block diagram illustrating an example of IDR data stored in the first cell block 211 of FIG. 1. Referring to FIGS. 1 to 3, IDR data may be stored in at least one row (or at least one page) of the first cell block 211. And, in FIG. 3, a case in which one page has a size of 16 KB is illustrated. In an embodiment, one page in which IDR data is stored in the first cell block 211 may be classified into a plurality of column regions, and the first IDR data IDR 1 may be stored in some of the column regions and the second IDR data IDR 2 may be stored in the other of the column regions. In addition, the column regions described above may be distinguished by a column address Y, and as an example, a column address Y in a first range may indicate a first column region, and a column address Y in a second range may indicate a second column region.

Similar to the reset operation on the setting data storage circuit 221 described above, the memory device 200 may selectively read IDR data of the first column region of the first cell block 211 and IDR data of the second column region by decoding a command from the memory controller 100. As an example, when a normal IDR command (CMD_IDR(N) or all full IDR commands) is provided to the memory device 200, the memory device 200 may provide the column address Y indicating the first column region and the second column region of the first cell block 211 to the first cell block 211. In addition, the IDR data read from the first column region and the second column region of the first cell block 211 may be updated to the first storage region 221_1 and the second storage region 221_2 of the setting data storage circuit 221.

When a selective IDR command (CMD_IDR (S) or some IDR commands) is provided to the memory device 200, the memory device 200 may provide the column address Y for selectively indicating the first column region of the first cell block 211 to the first cell block 211, and accordingly, IDR data read from the first column region of the first cell block 211 may be selectively updated to the first storage region 221_1 of the setting data storage circuit 221. In the example shown in FIG. 3, only the IDR data stored in a row is described, but the IDR data may be stored in at least two rows of the first cell block 211, and in this case, an address indicating a row region may be further used in selectively updating the IDR data.

FIG. 4 is a table illustrating examples of IDR data classification and resetting operations according to the embodiments described above. Referring to FIGS. 1 and 4, setting data or IDR data may be classified into at least two categories, and classification into information unrelated to setting of an I/O interface, as a first group of information, and information related to setting of an I/O interface, as a second group of information may be defined. Also, a super reset command or a partial reset command may be determined based on a result of decoding a command from the memory controller.

When a command from the memory controller corresponds to a super reset command, storage regions in which the first group of IDR data and the second group of IDR data are stored may all be reset. In addition, in relation to IDR data stored in a cell block, after initialization is performed by resetting all storage regions of the setting data storage circuit, the first group of IDR data and the second group of IDR data read from all column regions of the cell block may be updated to the setting data storage circuit.

When a command from the memory controller corresponds to a partial reset command, some of the storage regions in which the first group of IDR data is stored in the setting data storage circuit may be selectively reset. In addition, in relation to the IDR data stored in the cell block, as only some of the storage regions of the setting data storage circuit are selectively initialized, IDR data (e.g., the first group of IDR data) read from a column region corresponding to the initialized storage region in the cell block may be selectively updated to the setting data storage circuit. In addition, as the partial reset operation as described above is performed, the I/O setting information may not be reset or updated and an existing setting value may be maintained.

According to the embodiments described above, even if an error occurs in any one of a plurality of memory chips or a partial region of any one memory chip, there is no need to perform a super reset on all of the memory chips, and the error may be removed without having to initialize all the IDR data of the memory chip with an error.

The I/O setting information described in the above embodiments may be defined as a concept including various types of information. For example, when I/O setting information is defined as a narrow concept including a data I/O speed or operating frequency as an example, various types of IDR information, such as: (i) pin setting information indicating information transmitted and received by a plurality of pins, (ii) power setting information, such as a power supply voltage level, etc., and (iii) ODT information, such as a resistance value of on-die termination may be included, as other information related to data communication, in the second group of IDR data, and the above information may be defined as a type or group of information that is different from the I/O setting information. Alternatively, in embodiments, the I/O setting information may be defined as a broader concept, and as an example, the I/O setting information may be defined as a concept including at least some of a data I/O speed, pin setting information, power setting information, ODT information, and other information.

In addition, in the embodiments described above, the first group of IDR data on which a reset is performed during a partial reset operation may also include various types of information. As an example, various types of information capable of performing normal communication using newly updated IDR data in a state in which the memory controller is in a full differential mode and the memory device is in a pseudo differential mode may correspond to the first group of IDR data. As an example, various operating environments, such as an algorithm during program/read operations, a latch operation in a page buffer, and word line/bit line voltages, may be set based on the first group of IDR data.

FIG. 4 further shows an example of the first and second groups of IDR data. As an example, the first group of IDR data on which reset is performed in the case of partial reset may include information obtained by trimming various voltages used inside a memory device, bad block information BB, column repair information CR for repairing a defective column, core optimization information including an algorithm related to an operation, such as writing/reading of data. In addition, IDR data related to I/O setting on which reset is not performed in the case of partial reset may include on-die termination information ODT, driver strength information, impedance calibration information, duty cycle correction (DCC) training information, etc.

Figure 5:
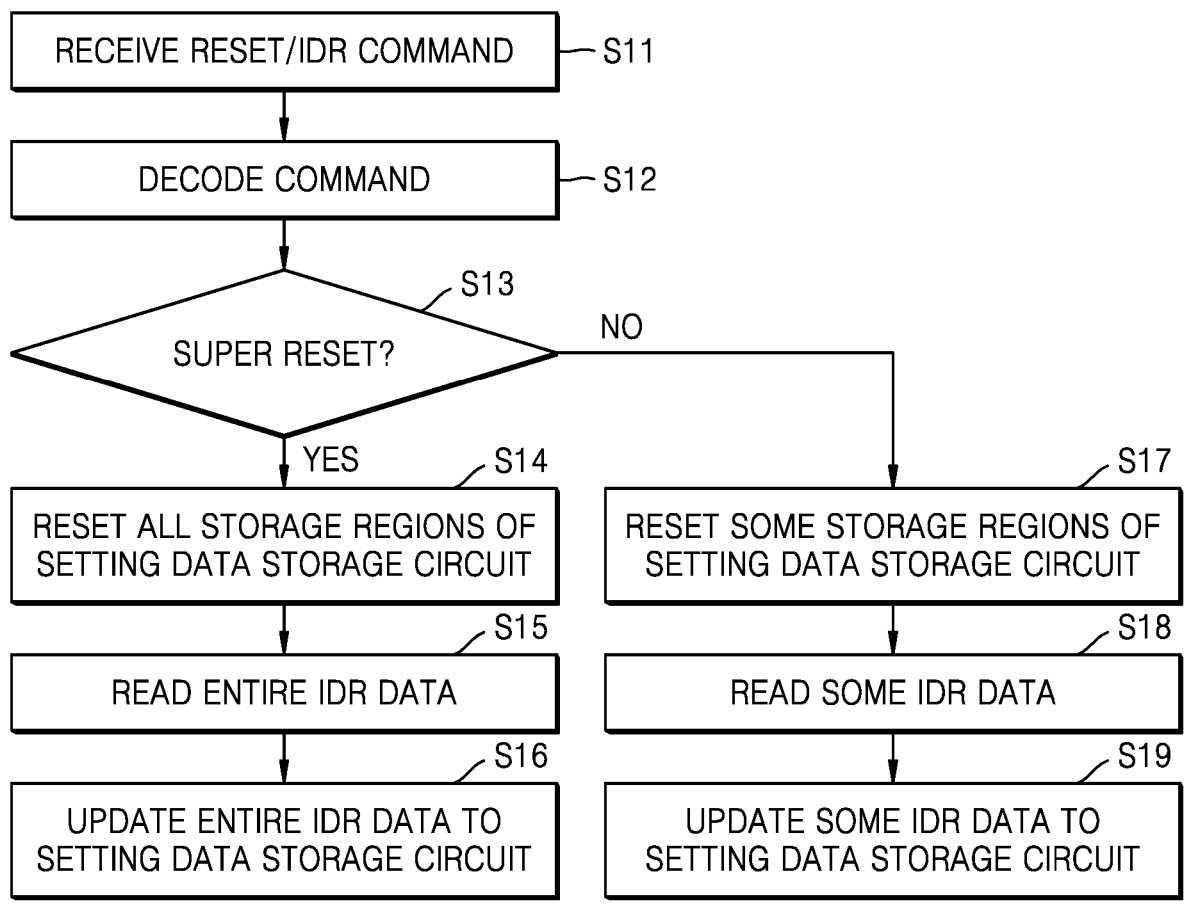
FIGS. 5 and 6 are flowcharts illustrating an example of an operation of a memory system, according to embodiments.
Figure 6:
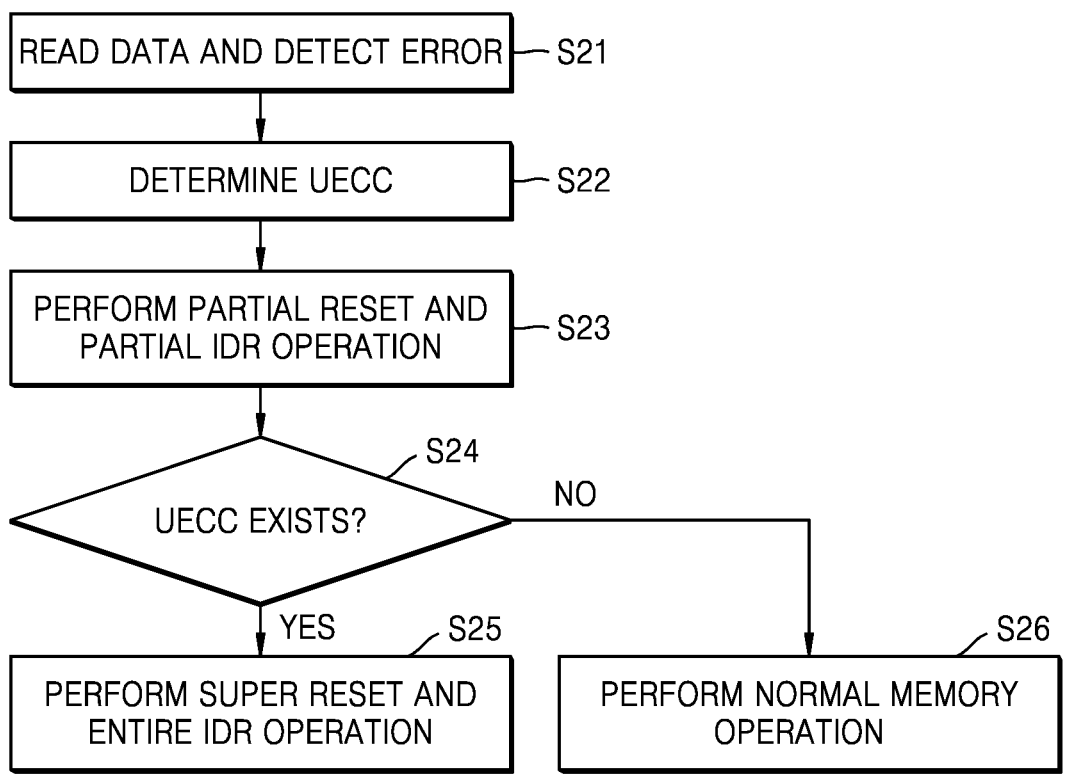

FIGS. 5 and 6 are flowcharts illustrating an example of an operation of a memory system, according to embodiments. Each operation of the flowcharts shown in FIGS. 5 and 6 may correspond to an operation performed by a memory controller or a memory device. Referring to FIG. 5, a memory controller may determine a timing to perform a resetting operation based on an error detection and determination operation in the process of accessing a memory device, and the memory device may receive a reset command and/or an IDR command from the memory controller (S11). Also, the memory device may decode the received reset command and/or IDR command (S12) and determine whether the reset command and/or IDR command is a command instructing a super reset for all setting data based on a decoding result (S13).

When the received command instructs the super reset for all setting data, the memory device may reset all of the storage regions which is provided in a setting data storage circuit and stores IDR data respectively (S14) and read all IDR data from a cell block (S15). In addition, all IDR data may include multiple groups of IDR data corresponding to all storage regions of the setting data storage circuit, and each of the multiple groups of IDR data may be updated to the corresponding storage regions (S16).

When the received command instructs to reset some of the setting data, only some storage regions in the setting data storage circuit may be selectively reset (S17). In an embodiment, a plurality of commands may be defined in relation to a reset operation, and storage regions in which a reset is performed may be selected from a plurality of storage regions included in the setting data storage circuit according to a command provided from the memory controller.

In addition, some IDR data among all IDR data may be selectively read from the cell block based on the decoding result (S18), and the read IDR data may be updated to reset storage regions in the setting data storage circuit (S19). Accordingly, some of the IDR data in the setting data storage circuit may maintain the existing setting values without being updated, as an example, as the existing set values of the I/O setting information are maintained, the memory controller and the memory device may perform an I/O interface based on the existing set values during a resetting process.

Referring to FIG. 6, the memory controller may receive data read from the memory device through a normal memory operation or a test operation during runtime and may perform error detection on the received data (S21). Also, the memory controller may include an error correction circuit (ECC) circuit and may perform an operation of correcting an error of the received data.

As the error occurring in the read data exceeds an error correction capability of the memory controller, the memory controller may determine the existence of an uncorrectable error UECC (S22) and perform at least one procedure to respond to the UECC determination. Although not shown in FIG. 6, the memory controller may employ at least one recovery algorithm for recovering an error and may attempt error correction by performing the recovery algorithm on the received data. If the error of the data is not corrected even by the above recovery algorithm, it may be predicted or determined that there is an error in information related to an operating environment of the memory device, and the reset operation and/or IDR operation in the embodiments described above may be performed when the error of the data is not corrected even by the above recovery algorithm.

As it is determined that the UECC exists, the partial reset and partial IDR operations described above may be performed, and accordingly, only some storage regions in the setting data storage circuit may be selectively reset, and some of IDR data stored in the cell block may be selectively read and updated to the setting data storage circuit. After the resetting operation is completed, it may be determined again whether an uncorrectable error UECC exists in the memory device (S24). When it is determined again that there is an uncorrectable error UECC according to the determination result, the memory controller may provide a super reset command/all IDR commands to the memory device, and the memory device may reset all storage regions in the setting data storage circuit, read all IDR data stored in the cell block, and update all IDR data to the setting data storage circuit (S25). When it is determined that the uncorrectable error UECC does not exist, the memory controller may determine that the error of the memory device is removed and perform a normal memory operation on the memory device (S26).

Figure 7:
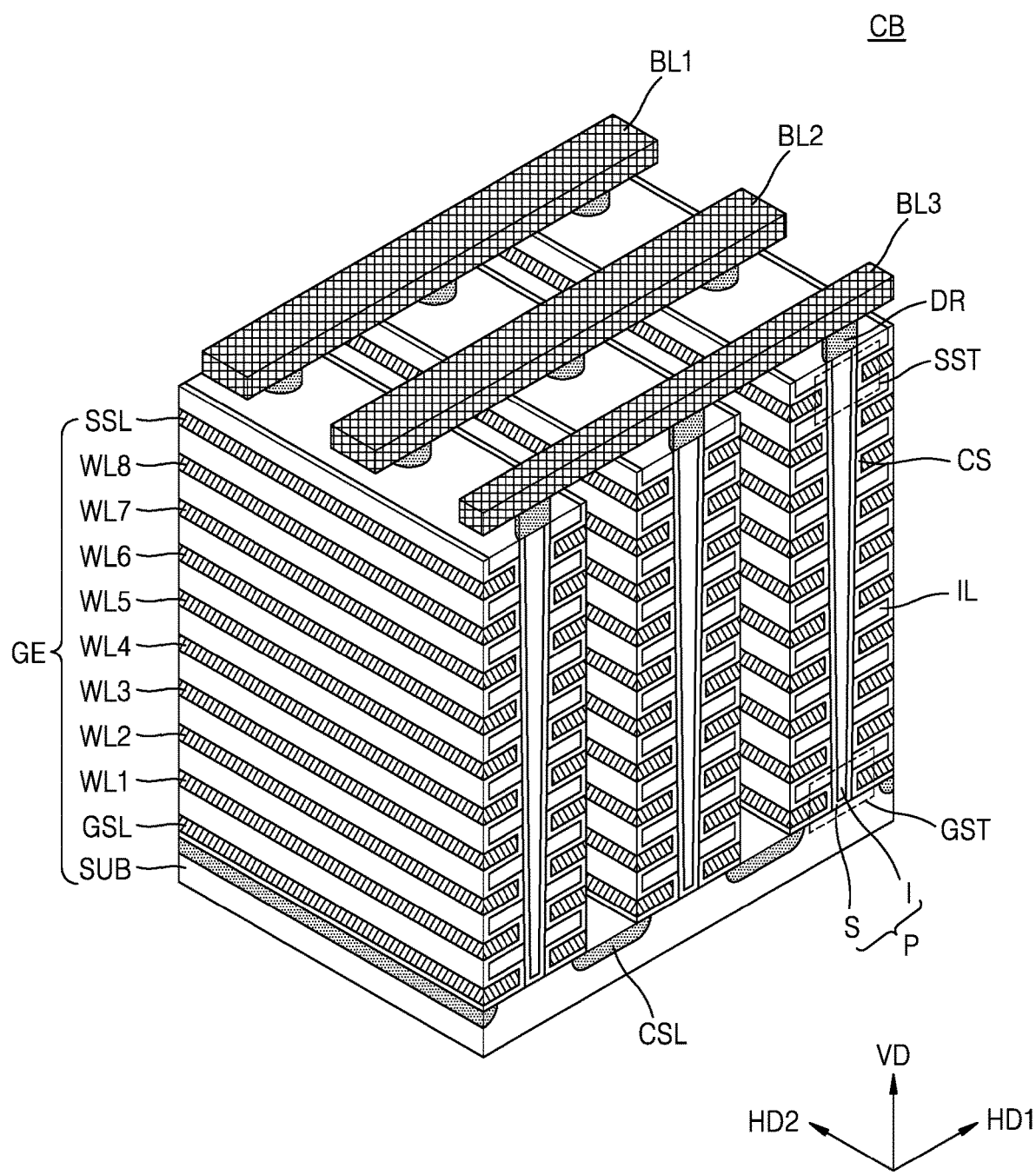
FIG. 7 is a perspective view illustrating an implementation example of a cell block of a memory device of the inventive concept.

FIG. 7 is a perspective view illustrating an implementation example of a cell block CB of a memory device of the inventive concept. In an embodiment, the aforementioned IDR data may be stored in at least one page of the cell block CB, and during an IDR operation, IDR data stored in some column regions of a portion of the page may be read and updated to the setting data storage circuit, while IDR data stored in column regions of other portions thereof may not be read.

Referring to FIG. 7, the cell block CB is formed in a direction perpendicular to a substrate SUB. The substrate SUB has a first conductivity type (e.g., p-type), extends in a second horizontal direction HD2 on the substrate SUB, and has a common source line CSL doped with second conductivity type (e.g., n-type) impurities. On a region of the substrate SUB between two adjacent common source lines CSL, a plurality of insulating films IL extending in the second horizontal direction HD2 are sequentially provided in a vertical direction VD, and the insulating films IL are spaced apart from each other by a certain distance in the vertical direction VD. For example, the insulating films IL may include an insulating material, such as a silicon oxide.

On the region of the substrate SUB between two adjacent common source lines CSL, a plurality of pillars P sequentially arranged in a first horizontal direction HD1 and passing through the insulating films IL in the vertical direction VD are provided. For example, the pillars P may contact the substrate SUB through the insulating films IL. In an embodiment, a surface layer S of each pillar P may include a first-type silicon material and may function as a channel region. In addition, an internal layer I of each pillar P may include an insulating material, such as a silicon oxide, or an air gap.

In a region between two adjacent common source lines CSL, a charge storage layer CS is provided along exposed surfaces of the insulating films IL, the pillars P, and the substrate SUB. The charge storage layer CS may include a gate insulating layer (or referred to as a 'tunneling insulating layer'), a charge trap layer, and a blocking insulating layer. For example, the charge storage layer CS may have an oxide-nitride-oxide (ONO) structure. In addition, in a region between two adjacent common source lines CSL, gate electrodes GE, such as select lines GSL and SSL and word lines WL0 to WL7, are provided on the exposed surface of the charge storage layer CS.

Drains or drain contacts DR are respectively provided on the pillars P. For example, the drains or drain contacts DR may include a silicon material doped with second conductivity-type impurities. Bit lines BL1 to BL3 extending in the first horizontal direction HD1 and spaced apart from each other by a certain distance in the second horizontal direction HD2 are provided on the drains DR.

Figure 8A:
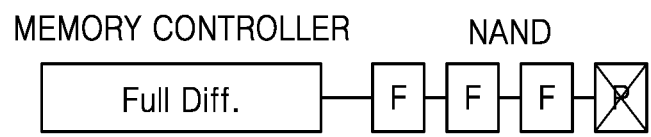
FIGS. 8A, 8B, and 8C are diagrams illustrating examples in which embodiments are applied to a memory device including a plurality of memory chips.
Figure 8B:
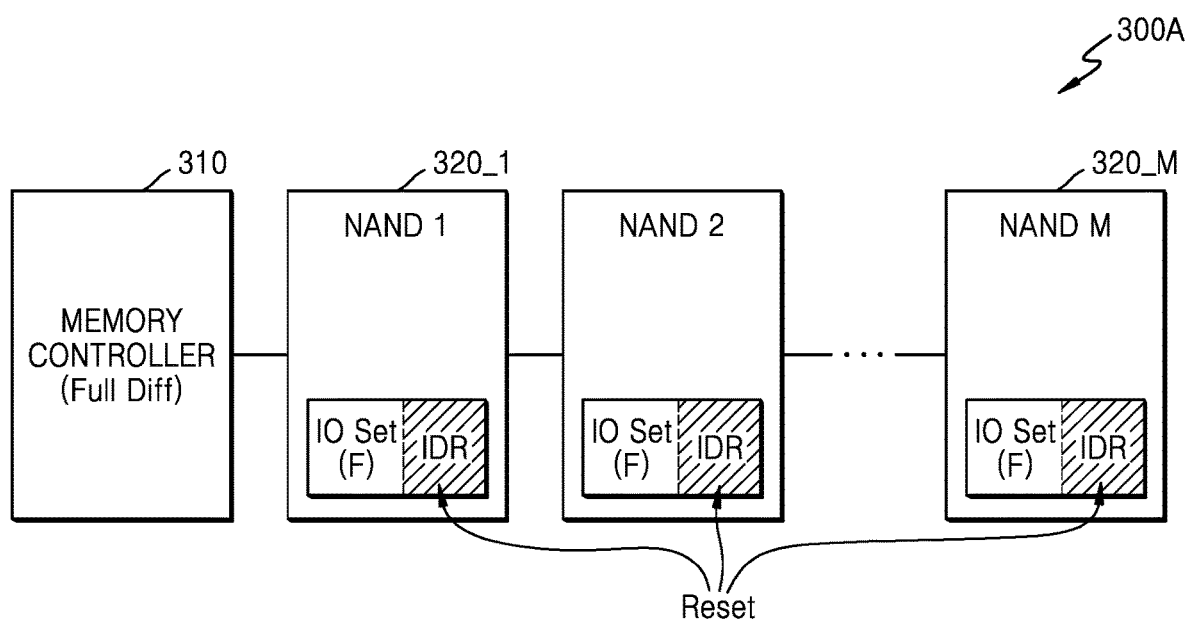
Figure 8C:
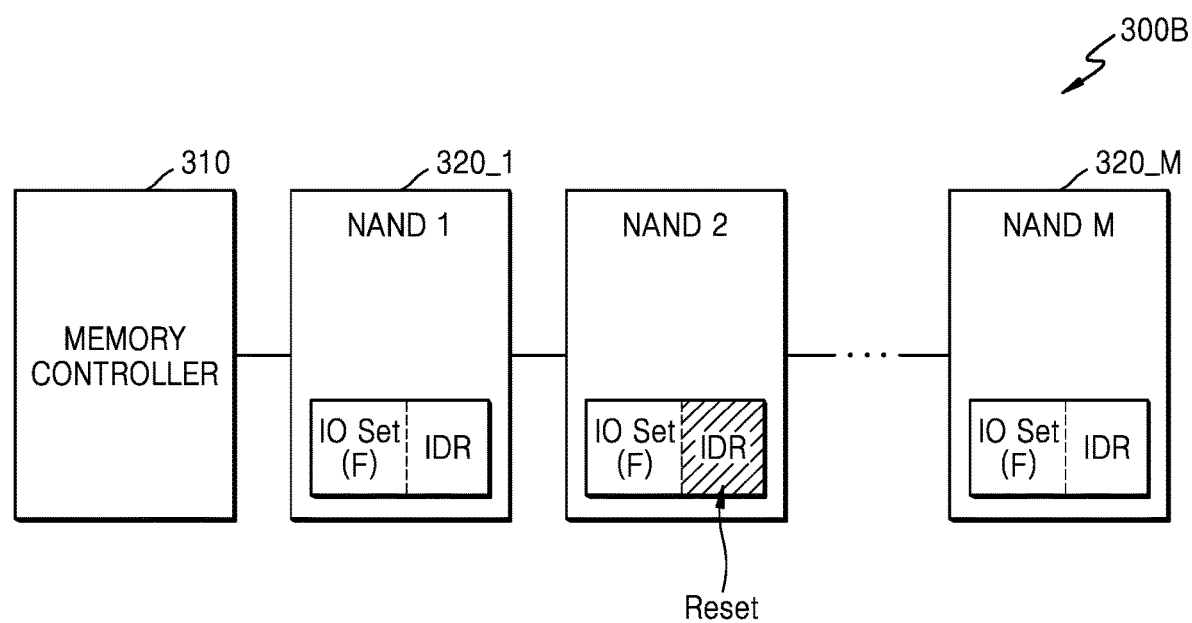

FIGS. 8A, 8B, and 8C are diagrams illustrating examples in which embodiments are applied to a memory device including a plurality of memory chips. As multiple memory chips, NAND chips including flash memory cells are illustrated in FIGS. 8A, 8B, and 8C. Referring to FIG. 8A, a memory controller may communicate with a plurality of NAND chips, and a communication environment between the memory controller and the NAND chips may be established in various modes when the NAND chips are initially driven. As an example, as the initial driving starts, a process of establishing an operating environment may be performed through communication between the memory controller and a memory device in a pseudo differential mode (or Pseudo Diff. (P) mode), and thereafter, various setting values related to the operating environment may be calculated through a training process between the memory controller and the memory device in a full differential mode (or Full Diff. (F) mode). As an example, communication may be performed based on a relatively low voltage and low I/O speed in the pseudo differential mode, and thereafter, high-speed communication between the memory controller and the memory device may be performed in the full differential mode based on various setting values including I/O setting information. In addition, various setting values calculated through the execution of the full differential mode may be stored together in the memory device and the memory controller.

As shown in FIG. 8A, it may be assumed that one NAND chip fails. For example, a defect due to neutrons during airplane transportation or a soft error caused by neutrons due to defects caused by neutrons due to a momentary malfunction during a server operation in which a NAND chip is employed may occur in one or more NAND chips, and in this case, a reset operation including an initialization operation may be required for all NAND chips.

Because the memory controller communicates with all NAND chips according to I/O interface conditions set in the full differential mode, if a super reset is performed on a failed NAND chip, I/O setting information stored in the failed NAND chip is reset, and a NAND chip entering the pseudo differential mode and the memory controller operating in the full differential mode cannot perform communication normally during a resetting operation. Also, even in the case of resetting the memory controller, as the memory controller enters the pseudo differential mode, normal communication between the memory controller and the remaining NAND chips that have not failed is impossible. That is, when the embodiments are not applied, a super reset and an entire IDR operation for all NAND chips are required.

Moreover, an operation example in the case of FIGS. 8B and 8C to which the embodiments are applied is described. FIG. 8B shows a case in which a partial reset operation is performed on all of a plurality of NAND chips, and FIG. 8C shows a case in which a partial reset operation is selectively performed on a failed NAND chip.

Referring to FIG. 8B, a memory system 300A may include a memory controller 310 and first to M-th NAND chips 320_1 to 320_M, and as the embodiments are applied to the memory system 300A, each of the first to M-th NAND chips 320_1 to 320_M may include a setting data storage circuit for storing IDR data, and the setting data storage circuit may include at least two storage regions. In an embodiment, the setting data storage circuit may include a first storage region and a second storage region, and it is assumed that the first storage region stores IDR data to be reset in a partial reset process and the second storage region stores IDR data on which reset is not performed in the partial reset process.

The memory controller 310 may communicate with the first to M-th NAND chips 320_1 to 320_M according to I/O setting information IO Set in the full differential mode. In addition, when a failure occurs in at least one of the first to M-th NAND chips 320_1 to 320_M, IDR data of the first storage region may be selectively reset in the setting data storage circuit of each of the first to M-th NAND chips 320_1 to 320_M. In addition, in each of the setting data storage circuits of the first to M-th NAND chips 320_1 to 320_M, the IDR data related to the I/O setting information IO Set may maintain the existing setting value without being reset. In addition, according to the embodiments described above, some IDR data read from the cell block may be updated to the first storage region of the setting data storage circuit of each of the first to M-th NAND chips 320_1 to 320_M, and communication may be performed between the memory controller 310 and the first to M-th NAND chips 320_1 to 320_M based on an operating environment according to the IDR data updated through the resetting operation as described above.

Referring to FIG. 8C, a memory system 300B may include a memory controller 310 and first to M-th NAND chips 320_1 to 320_M, and it is assumed that the second NAND chip 320_2 may have a defect. As in the embodiment shown in FIG. 8C, a partial reset operation according to embodiments may be selectively performed on the failed second NAND chip 320_2. For example, based on a command from the memory controller 310, the first storage region of the setting data storage circuit included in the second NAND chip 320_2 may be selectively reset, and IDR data (e.g., IDR data unrelated to I/O setting information) read from a cell block of the second NAND chip 320_2 may be updated to the first storage region of the second NAND chip 320_2.

FIGS. 8B and 8C describe a case in which an error of a failed NAND chip is removed through the partial reset process according to embodiments, but when the error is not removed through the partial reset process described above, removal of the error may be attempted by performing a super reset on the first to M-th NAND chips 320_1 to 320_M.

Figure 9:
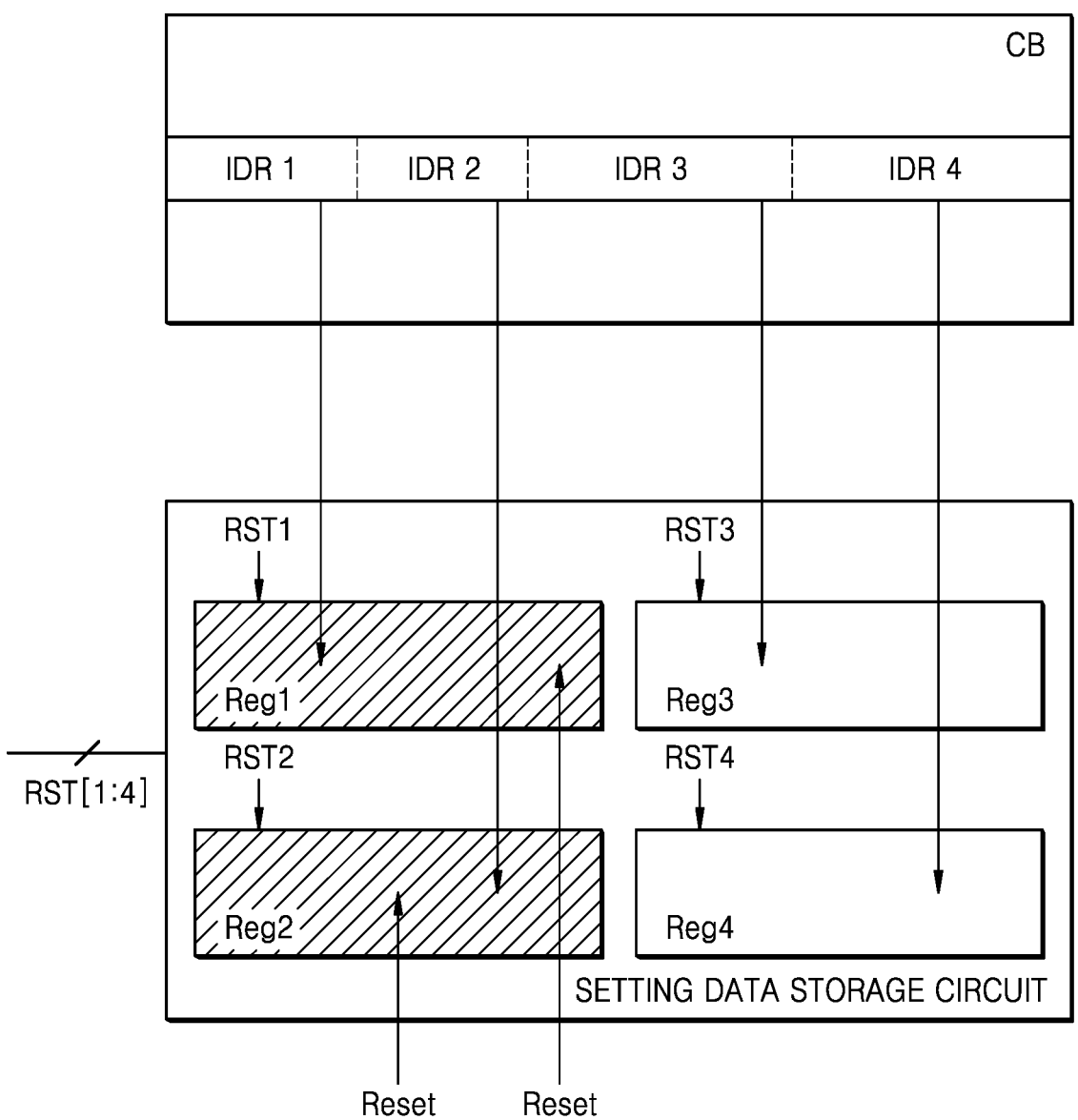
FIG. 9 is a diagram illustrating an example in which embodiments are applied to a memory device including a single chip.

FIG. 9 is a diagram illustrating an example in which embodiments are applied to a memory device including a single chip. FIG. 9 illustrates a case in which IDR data is classified into first to fourth IDR data IDR 1 to IDR 4 according to types of IDR data.

The IDR data may be stored in a certain location (or a certain page) of a certain cell block CB during a manufacturing process of the memory device, and according to embodiments, the first to fourth IDR data for each type of IDR data IDR 1 to IDR 4 may each be stored in a certain column region.

The setting data storage circuit in the memory device may include storage regions corresponding to column regions in which IDR data is stored. As an example, as the IDR data is classified into first to fourth IDR data IDR 1 to IDR 4, the setting data storage circuit may include first to fourth storage regions Reg1 to Reg4, and the first to fourth IDR data IDR 1 to IDR 4 read from the cell block CB during an initial driving of the memory device may be stored in regions corresponding to the first to fourth storage regions Reg1 to Reg4, respectively.

The memory device may provide the reset control signal RST to the setting data storage circuit by decoding a command from the memory controller, and a transfer path through which the reset control signal RST is transmitted may be located to be physically or electrically separated to correspond to the first to fourth storage regions Reg1 to Reg4. As an example, when the first and second IDR data IDR 1 and IDR 2 are selectively reset during a partial reset process, the reset control signal RST may include first to fourth reset control signals RST[1:4], and when a partial reset is performed, the first and second reset control signals RST[1,2] may reset the first and second storage regions Reg1 and Reg2. In addition, the third and fourth reset control signals RST[3,4] may not be provided to the third and fourth storage regions Reg3 and Reg4, or the third and fourth reset control signals RST[3, 4] may have a logic level that does not reset the third and fourth storage regions Reg3 and Reg4.

Although a single cell block is shown in the embodiment shown in FIG. 9, embodiments may not be limited thereto. As an example, a single NAND chip may include a plurality of dies DIE, and each of the dies DIE may include a cell block and a setting data storage circuit. In an embodiment, a partial reset operation may be selectively performed on a die in which a failure occurs, among the dies DIE or may be performed on all of the dies DIE.

Figure 10:
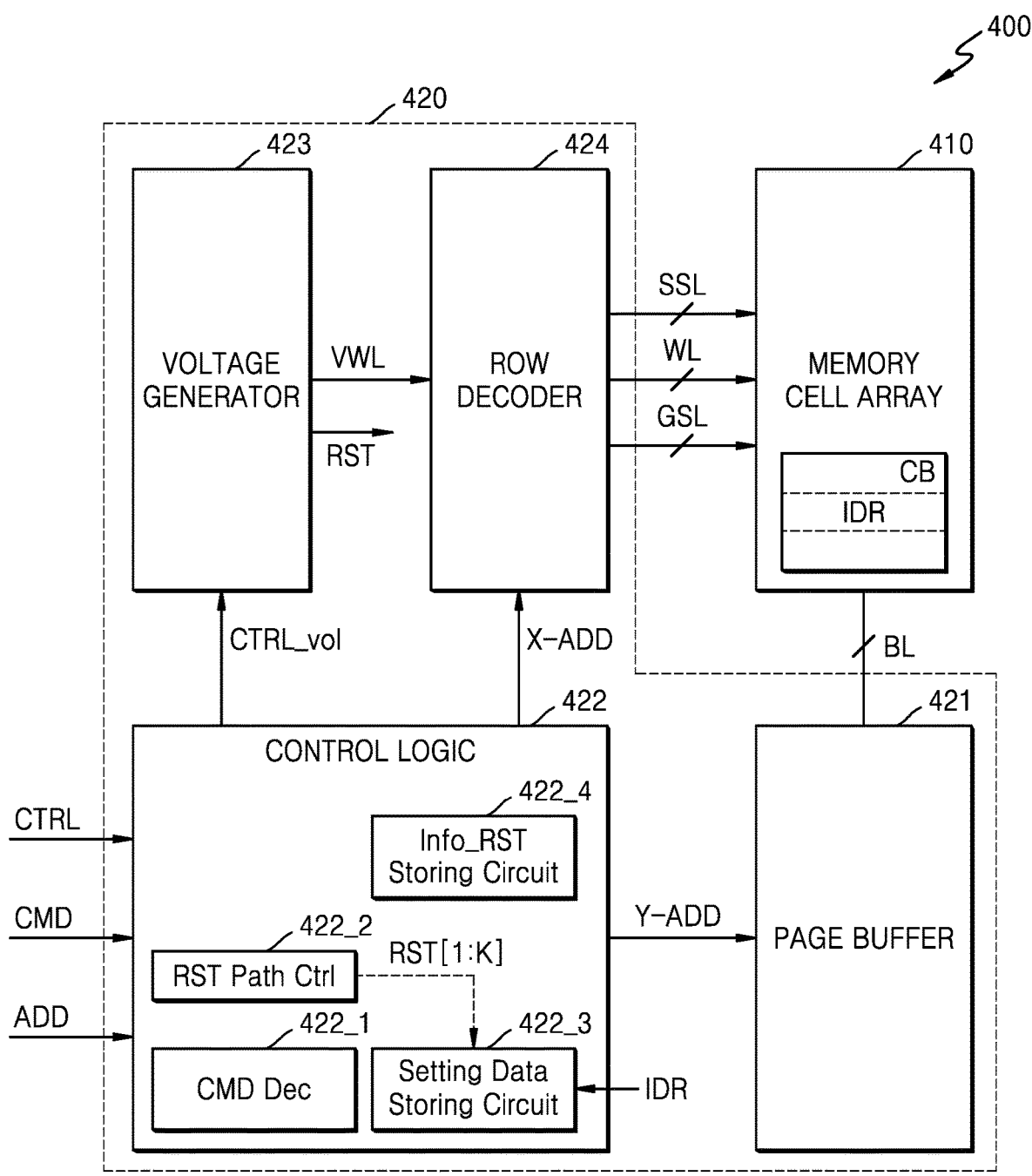
FIGS. 10 and 11 are block diagrams illustrating a memory device according to embodiments.
Figure 11:
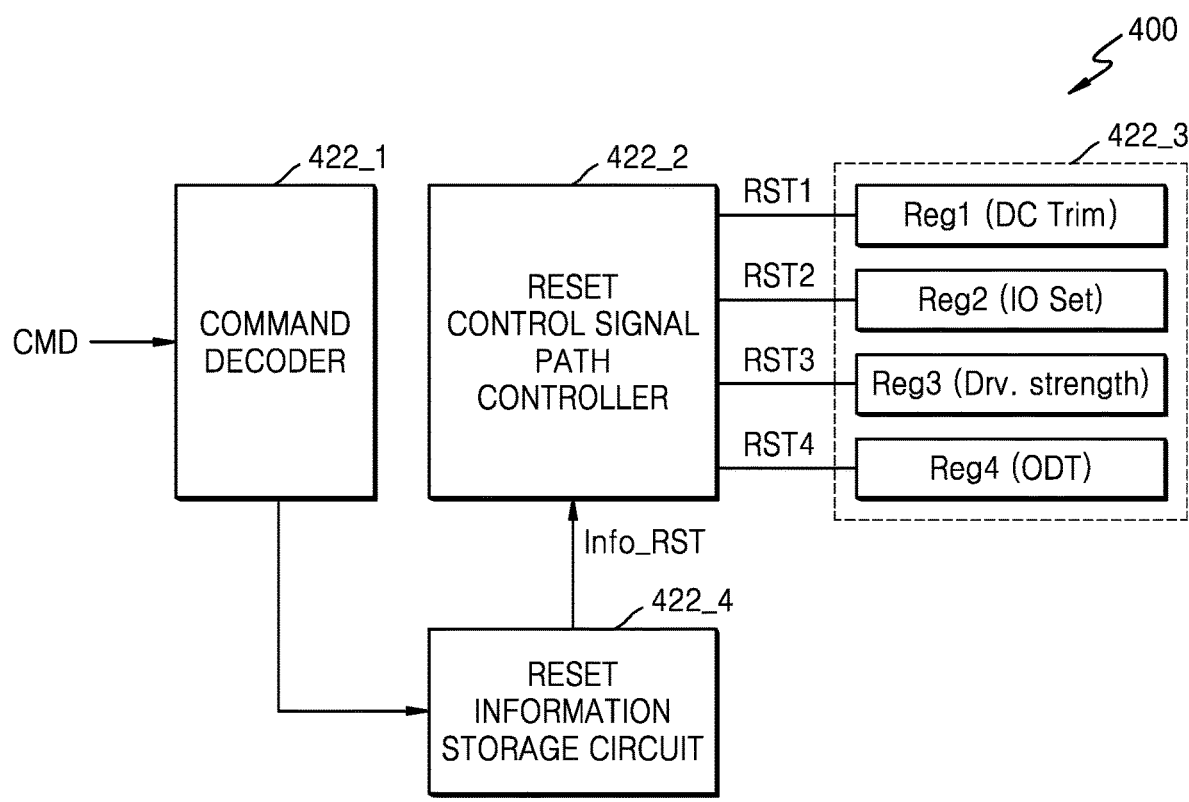

FIGS. 10 and 11 are block diagrams illustrating a memory device 400 according to embodiments. Referring to FIGS. 10 and 11, the memory device 400 may include a memory cell array 410 and a peripheral circuit 420, and the peripheral circuit 420 may include a page buffer 421, a control logic 422, a voltage generator 423, and a row decoder 424. Although not shown in FIG. 10, the peripheral circuit 420 may further include various components, such as a data I/O circuit or an I/O interface.

The memory cell array 410 may be connected to the page buffer 421 through bit lines BL and may be connected to the row decoder 424 through word lines WL, string select lines SSL, and ground select lines GSL. The memory cell array 410 may include a plurality of cell blocks, and IDR data may be stored in at least one cell block CB.

The control logic 422 may program data into the memory cell array 410 based on a command CMD, an address ADD, and a control signal CTRL and output various control signals, for example, a voltage control signal CTRL_vol, a row address X_ADD, and a column address Y_ADD, for reading data from the memory cell array 410. The control logic 422 may provide the voltage control signal CTRL_vol to the voltage generator 423, thereby adjusting the level of a voltage generated by the voltage generator 423. The voltage generator 423 may generate various types of voltages for performing program, read, and erase operations on the memory cell array 410 based on the voltage control signal CTRL_vol. As an example, the voltage generator 423 may generate the reset control signal RST in the embodiments described above based on the voltage control signal CTRL_vol.

The control logic 422 may include one or more functional blocks or circuit blocks for controlling operations according to embodiments. For example, the control logic 422 may include a command decoder 422_1, a reset control signal path controller 422_2, a setting data storage circuit 422_3, and a reset information storage circuit 422_4. IDR data read from the cell block CB may be stored in a plurality of storage regions in the setting data storage circuit 422_3.

The command CMD from the memory controller may include various types of reset commands (or IDR commands), and a transfer path through which the reset control signal RST is provided to the storage regions in the setting data storage circuit 422_3 may be controlled according to a decoding result of the command decoder 422_1. For example, the reset control signal path controller 422_2 may receive the reset control signal RST and output first to K-th reset signals RST[1: K] corresponding to K storage regions in the setting data storage circuit 422_3, and some of the K storage regions may be reset and the others may not be reset according to the logic levels of the first to K-th reset signals RST[1:K].

In an embodiment, the reset information storage circuit 422_4 may store reset information Info_RST for selecting a storage region in which a reset is performed based on a command decoding result. Accordingly, when different commands are provided from the memory controller, the reset information storage circuit 422_4 may provide reset information Info_RST having different values to the reset control signal path controller 422_2 according to the command decoding result, and the reset control signal path controller 422_2 may reset the different storage regions in the setting data storage circuit 422_3.

According to embodiments, a plurality of reset commands related to a reset operation may be defined between a memory controller and the memory device 400, and locations of storage regions in which a reset is to be performed may change in response to each reset command. In the embodiment shown in FIG. 10, it is described that the reset information Info_RST is stored in a separate storage circuit of the control logic 422, but embodiments may not be limited thereto. As an example, the reset information storage circuit 422_4 may be provided outside the control logic 422. Alternatively, the reset information Info_RTS may be stored as IDR information in the cell block CB. In this case, the reset information Info_RTS may be read as first IDR data or second IDR data and stored in the setting data storage circuit 422_3.

In addition, although not shown in FIG. 10, similar to the reset information Info_RTS described above, information related to a column region for selectively reading the first IDR data in a partial IDR operation may be stored in the memory device 400 in a nonvolatile manner. In an embodiment, the information related to the column region may be stored in a storage circuit inside or outside the control logic 422, or the information related to the column region may be stored in the cell block CB as IDR data. Also, in the IDR operation, information related to column regions having different values according to the types of IDR commands may be provided to the cell block CB.

FIG. 11 shows an example in which the setting data storage circuit 422_3 in FIG. 10 includes first to fourth storage regions Reg1 to Reg4 and the reset control signal RST is selectively provided to some storage regions according to path control. In an embodiment, the first storage region Reg1 may store IDR data for which reset is performed during a partial reset operation. For example, a case in which the first storage region Reg1 stores voltage trim information DC Trim is illustrated. Meanwhile, the second to fourth storage regions Reg2 to Reg4 may store IDR data for which reset is not performed during a partial reset operation. For example, a case in which the second storage region Reg2 stores information related to I/O setting IO Set, the third storage region Reg3 stores information related to driver strength DRV. strength, and the fourth storage region Reg4 stores information related to on-die termination ODT is illustrated.

Meanwhile, the first to fourth reset control signals RST1 to RST4 may be provided to the first to fourth storage regions Reg1 to Reg4 under the control by the reset control signal path controller 422_2, and by activating only some of the first to fourth reset control signals RST1 to RST4 based on the reset information Info_RST from the reset information storage circuit 422_4, only some storage regions among the first to fourth storage regions Reg1 to Reg4 may be selectively reset.

Figure 12:
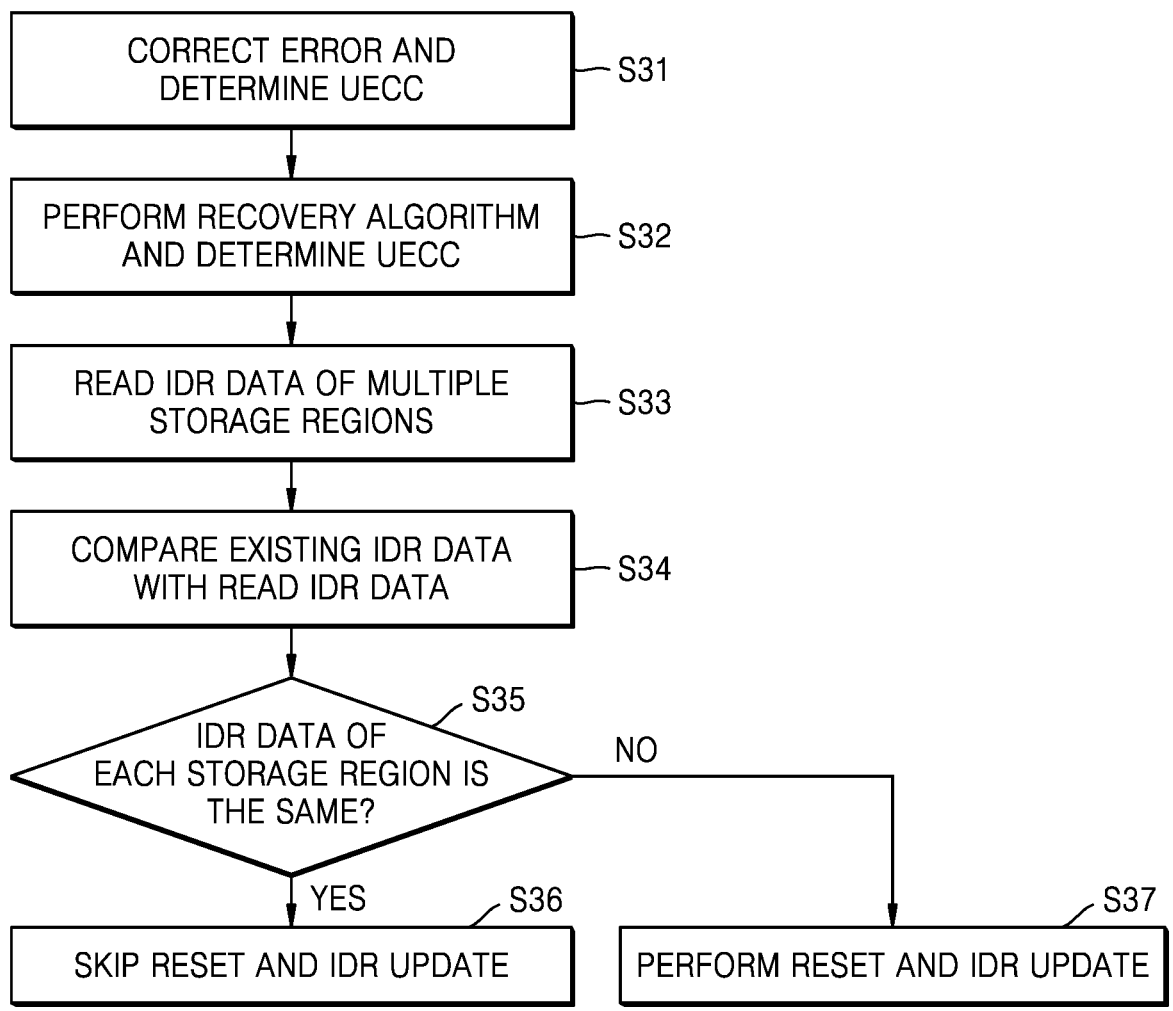
FIG. 12 is a flowchart illustrating a method of operating a memory controller, according to embodiments.

FIG. 12 is a flowchart illustrating an operating method of a memory controller according to embodiments. The memory controller may control an initial driving process of the memory device, and as an example, the memory controller may read IDR data from a cell block of the memory device and control a training process on the memory device, and when the IDR data is stored in the setting data storage circuit in the memory device, some of the IDR data may be changed in value and stored in the setting data storage circuit. In an embodiment, IDR data on which the training process is not performed or having an unchanged value may correspond to the t IDR data in the embodiment described above, and IDR data having a value changed in the training process may correspond to the second IDR data in the embodiment described above, but the embodiments are not limited thereto and the first IDR data and the second IDR data may be defined according to various methods. Also, the first IDR data and the second IDR data stored in the setting data storage circuit may be provided to the memory controller, and thus, the memory controller may store the first IDR data and the second IDR data together.

The memory controller may perform a memory operation on the memory device, perform error correction on read data, and determine whether an uncorrectable error UECC exists (S31). In addition, the memory controller may perform a recovery algorithm depending on whether a UECC exists, and may determine that a UECC exists even after performing the recovery algorithm (S32).

Depending on whether the UECC exists, the memory controller may control the reset operation and/or the IDR update operation according to embodiments. As an example, the memory controller may read and receive IDR data from a plurality of storage regions included in the setting data storage circuit (S33) and compare existing IDR data stored in the memory controller with a value of IDR data read from the storage regions (S34). In addition, the values of the existing IDR data and the read IDR data may be compared for each storage region, and it may be determined whether the values are equal to each other (S35).

The memory controller may skip the reset and IDR update operations for the storage region when the values of the existing IDR data and the read IDR data are the same for each storage region (S36). Meanwhile, if the values of the existing IDR data and the read IDR data are different, the memory controller may control to perform reset and IDR update operations on the storage region (S36).

According to the above embodiment, it is determined whether the value is changed due to a cause, such as a soft error in units of each storage region, and based on this, IDR update may be selectively performed. If the embodiment is applied to the storage regions storing the above-described first IDR data, the IDR update operation does not need to be performed on all first IDR data, so time and resources required for the reset operation may be further reduced.

Figure 13:
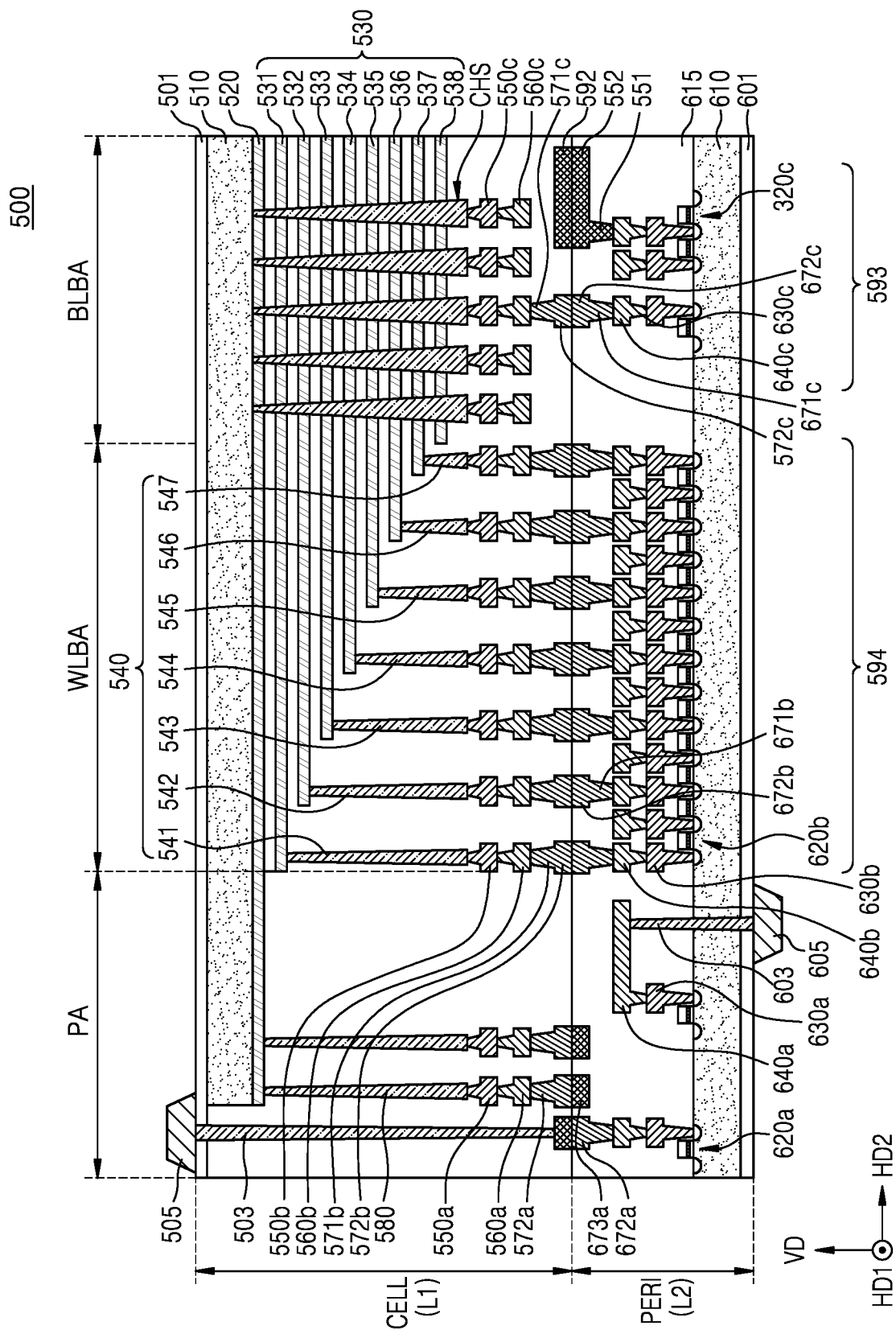
FIG. 13 is a cross-sectional view of a memory device having a bonding-vertical NAND (B-VNAND) structure, according to an embodiment.

FIG. 13 is a cross-sectional view illustrating a memory device 500 having a B-VNAND structure, according to an embodiment. IDR data according to embodiments may be stored in a first semiconductor layer L1, and the setting data storage circuit may be implemented in a second semiconductor layer L2 including a peripheral storage region PERI. Referring to FIG. 13, a cell region CELL of the memory device 500 may correspond to the first semiconductor layer L1, and the peripheral storage region PERI may correspond to the second semiconductor layer L2. Each of the peripheral storage region PERI and cell region CELL of the memory device 500 may include an external pad bonding region PA, a word line bonding region WLBA, and a bit line bonding region BLBA. For example, the word lines WL, the string select lines SSL, the ground select lines GSL, and the memory cell array 410 of FIG. 10 are formed in the first semiconductor layer L1, and the control logic 422, the page buffer 421, the voltage generator 423, and the row decoder 424 may be formed in the second semiconductor layer L2.

The peripheral storage region PERI may include a first substrate 610, an interlayer insulating layer 615, a plurality of circuit elements 620a, 620b, and 620c formed on the first substrate 610, first metal layers 630a, 630b, and 630c respectively connected to the circuit elements 620a, 620b, and 620c, and second metal layers 640a, 640b, and 640c formed on the first metal layers 630a, 630b, and 630c. In an embodiment, the first metal layers 630a, 630b, and 630c may include tungsten having relatively high resistance, and the second metal layers 640a, 640b, and 640c may include copper having relatively low resistance.

In this specification, only the first metal layers 630a, 630b, and 630c and the second metal layers 640a, 640b, and 640c are shown, but the inventive concept is not limited thereto, and at least one metal layer may be formed on the second metal layers 640a, 640b, and 640c. At least some of the one or more metal layers formed on the second metal layers 640a, 640b, and 640c may include aluminum having a lower resistance than copper forming the second metal layers 640a, 640b, and 640c.

The interlayer insulating layer 615 may be located on the first substrate 610 to cover the circuit elements 620a, 620b, and 620c, the first metal layers 630a, 630b, and 630c, and the second metal layers 640a, 640b, and 640c and may include an insulating material, such as a silicon oxide or a silicon nitride. Lower bonding metals 671b and 672b may be formed on the second metal layer 640b of the word line bonding region WLBA. In the word line bonding region WLBA, the lower bonding metals 671b and 672b of the peripheral storage region PERI may be electrically connected to the upper bonding metals 571b and 572b of the cell region CELL by a bonding method, and the lower bonding metals 671b and 672b and the upper bonding metals 571b and 572b may include aluminum, copper, or tungsten.

The cell region CELL may provide at least one cell block. The cell region CELL may include the second substrate 510 and the common source line 520. A plurality of word lines 531 to 538 (530) may be stacked on the second substrate 510 in the vertical direction VD with respect to the upper surface of the second substrate 510. String select lines and a ground select line may be disposed above and below the word lines 530, and the word lines 530 may be located between the string select lines and the ground select line.

In the bit line bonding region BLBA, the channel structure CHS may extend in a direction perpendicular to the upper surface of the second substrate 510 and pass through the word lines 530, the string select lines, and the ground select line. The channel structure CHS may include a data storage layer, a channel layer, and a buried insulating layer, and the channel layer may be electrically connected to the first metal layer 550c and the second metal layer 560c. For example, the first metal layer 550c may be a bit line contact, and the second metal layer 560c may be a bit line. In an embodiment, the bit line 560c may extend in the second horizontal direction HD2 parallel to the upper surface of the second substrate 510.

In an embodiment, a region in which the channel structure CHS and the bit line 560c are arranged may be defined as a bit line bonding region BLBA. The bit line 560c may be electrically connected to the circuit elements 620c providing the page buffer 593 of the peripheral storage region PERI in the bit line bonding region BLBA. For example, the bit line 560c may be connected to upper bonding metals 571c and 572c of the cell region CELL, and the upper bonding metals 571c and 572c may be connected to lower bonding metals 671c and 672c connected to the circuit elements 620c of the page buffer 593. Accordingly, the page buffer 593 may be connected to the bit line 560c through the bonding metals 571c, 572c, 671c, and 672c.

In an embodiment, the memory device 400 may further include a through-electrode THV located in the bit line bonding region BLBA. The through-electrode THV may pass through the word lines 530 to extend in the vertical direction VD. The through-electrode THV may be connected to the common source line 520 and/or the upper substrate 510. Although not shown, an insulating ring may be located around the through-electrode THV, and the through-electrode THV may be insulated from the word lines 530. The through-electrode THV may be connected to the peripheral storage region PERI through the upper bonding metal 572d and the lower bonding metal 672d.

In the word line bonding region WLBA, the word lines 530 may extend in the first horizontal direction HD1 parallel to the upper surface of the second substrate 510 and may be connected to cell contact plugs 541 to 541 to 547 (540). The word lines 530 and the cell contact plugs 540 may be connected to each other through pads provided as at least some of the word lines 530 extend to have different lengths in the vertical direction VD. A first metal layer 550b and a second metal layer 560b may be sequentially connected to upper portions of the cell contact plugs 540 connected to the word lines 530. The cell contact plugs 540 may be connected to the peripheral storage region PERIO through the upper bonding metals 571b and 572b of the cell region CELL and the lower bonding metals 671b and 672b of the peripheral storage region PERI in the word line bonding region WLBA.

The cell contact plugs 540 may be electrically connected to circuit elements 620b providing the row decoder 594 in the peripheral storage region PERI. In an embodiment, an operating voltage of the circuit elements 620b providing the row decoder 594 may be different from an operating voltage of the circuit elements 620c providing the page buffer 593. For example, operating voltages of the circuit elements 620c providing the page buffer 593 may be higher than operating voltages of circuit elements 620b providing the row decoder 594.

A common source line contact plug 580 may be located in the external pad bonding region PA. The common source line contact plug 580 may include a conductive material, such as metal, a metal compound, or polysilicon, and may be electrically connected to the common source line 520. A first metal layer 550a and a second metal layer 560a may be sequentially stacked on the common source line contact plug 580. For example, a region in which the common source line contact plug 580, the first metal layer 550a, and the second metal layer 560a are disposed may be defined as an external pad bonding region PA.

Meanwhile, I/O pads 505 and 605 may be located in the external pad bonding region PA. A lower insulating film 601 covering a lower surface of the first substrate 610 may be formed below the first substrate 610, and the first I/O pad 605 may be formed on the lower insulating film 601. The first I/O pad 605 may be connected to at least one of the circuit elements 620a, 620b, and 620c arranged in the peripheral storage region PERI through the first I/O contact plug 603 and may be separated from the first substrate 610 by the lower insulating film 601. In addition, a side insulating film may be located between the first I/O contact plug 603 and the first substrate 610 to electrically separate the first I/O contact plug 603 from the first substrate 610.

An upper insulating film 501 covering an upper surface of the second substrate 510 may be formed on the second substrate 510, and second I/O pad 505 may be disposed on the upper insulating film 501. The second I/O pad 505 may be connected to at least one of the circuit elements 620a, 620b, and 620c arranged in the peripheral storage region PERI through the second I/O contact plug 503.

According to embodiments, the second substrate 510 and the common source line 520 may not be located in a region in which the second I/O contact plug 503 is located. Also, the second I/O pad 505 may not overlap the word lines 530 in a third direction (a Z-axis direction). The second I/O contact plug 503 may be separated from the second substrate 510 in a direction parallel to the upper surface of the second substrate 510 and connected to the second I/O pad 505 through the interlayer insulating layer of the cell region CELL.

According to embodiments, the first I/O pad 605 and the second I/O pad 505 may be selectively formed. For example, the memory device 500 may include only the first I/O pad 605 disposed on the first substrate 610 or only the second I/O pad 505 disposed on the second substrate 510. Alternatively, the memory device 500 may include both the first I/O pad 605 and the second I/O pad 505. A metal pattern of the uppermost metal layer may exist as a dummy pattern in each of the external pad bonding region PA and the bit line bonding region BLBA included in the cell region CELL and the peripheral storage region PERI, respectively, or the uppermost metal layer may be empty.

In the external pad bonding region PA of the memory device 500, a lower metal pattern 673a having the same shape as that of the upper metal pattern 572a may be formed on the uppermost metal layer of the peripheral storage region PERI to correspond to the upper metal layer 572a formed on the uppermost metal layer of the cell region CELL. The lower metal pattern 673a formed on the uppermost metal layer of the peripheral storage region PERI may not be connected to a separate contact in the peripheral storage region PERI. Similarly, an upper metal pattern having the same shape as that of the lower metal pattern of the peripheral storage region PERIO may be formed on the upper metal layer of the cell region CELL to correspond to the lower metal pattern formed on the uppermost metal layer of the peripheral storage region PERI in the external pad bonding region PA.

Lower bonding metals 671b and 672b may be formed on the second metal layer 640b of the word line bonding region WLBA. In the word line bonding region WLBA, the lower bonding metals 671b and 672b of the peripheral storage region PERI may be electrically connected to the upper bonding metals 571b and 572b of the cell region CELL by a bonding method.

In addition, in the bit line bonding region BLBA, the upper metal pattern 592 having the same shape as that of the lower metal pattern 652 may be formed on the uppermost metal layer of the cell region CELL to correspond to the lower metal pattern 652 formed on the uppermost metal layer of the peripheral storage region PERI. A contact may not be formed on the upper metal pattern 592 formed on the uppermost metal layer of the cell region CELL.

Figure 14:
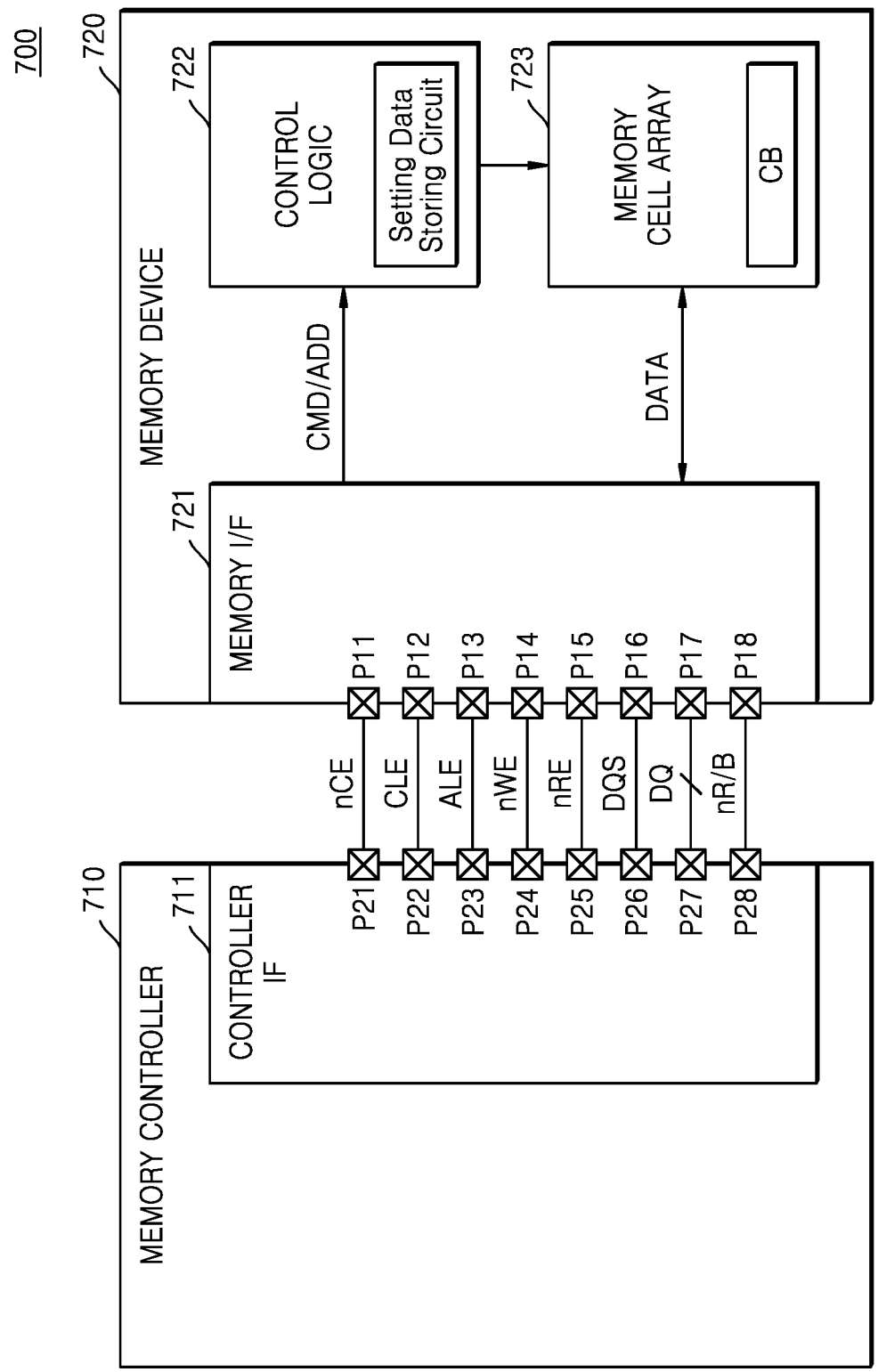
FIG. 14 is a block diagram illustrating a memory system according to an embodiment.

FIG. 14 is a block diagram of a memory system 700 according to an embodiment. Referring to FIG. 14, the memory system 700 may include a memory device 720 and a memory controller 710. The memory device 720 may correspond to the memory device 200 of FIG. 1. And, the memory controller 710 may correspond to the memory controller 100 of FIG. 1. The memory device 720 may include first to eighth pins P11 to P18, a memory interface circuitry 721, a control logic circuitry 722, and a memory cell array 723. In an embodiment, the memory cell array 723 may include a cell block that stores IDR data, and the control logic 722 may include setting data storage circuit.

The memory interface circuitry 721 may receive a chip enable signal nCE from the memory controller 710 through the first pin P11. The memory interface circuitry 721 may transmit and receive signals to and from the memory controller 400 through the second to eighth pins P12 to P18 in response to the chip enable signal nCE. For example, when the chip enable signal nCE is in an enable state (e.g., a low level), the memory interface circuitry 721 may transmit and receive signals to and from the memory controller 400 through the second to eighth pins P12 to P18.

The memory interface circuitry 721 may receive a command latch enable signal CLE, an address latch enable signal ALE, and a write enable signal nWE from the memory controller 710 through the second to fourth pins P12 to P14. The memory interface circuitry 721 may receive a data signal DQ from the memory controller 710 through the seventh pin P17 or transmit the data signal DQ to the memory controller 400. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 721 may obtain the command CMD from the data signal DQ, which is received in an enable section (e.g., a high-level state) of the command latch enable signal CLE based on toggle time points of the write enable signal nWE. The memory interface circuitry 721 may obtain the address ADDR from the data signal DQ, which is received in an enable section (e.g., a high-level state) of the address latch enable signal ALE based on the toggle time points of the write enable signal nWE.

In an embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 721 may obtain the command CMD or the address ADDR based on toggle time points of the write enable signal nWE.

The memory interface circuitry 721 may receive a read enable signal nRE from the memory controller 710 through the fifth pin P15. The memory interface circuitry 721 may receive a data strobe signal DQS from the memory controller 710 through the sixth pin P16 or transmit the data strobe signal DQS to the memory controller 710.

In a data (DATA) output operation of the memory device 720, the memory interface circuitry 721 may receive the read enable signal nRE, which toggles through the fifth pin P15, before outputting the data DATA. The memory interface circuitry 721 may generate the data strobe signal DQS, which toggles based on the toggling of the read enable signal nRE. For example, the memory interface circuitry 721 may generate a data strobe signal DQS, which starts toggling after a predetermined delay (e.g., tDQSRE), based on a toggling start time of the read enable signal nRE. The memory interface circuitry 721 may transmit the data signal DQ including the data DATA based on a toggle time point of the data strobe signal DQS. Thus, the data DATA may be aligned with the toggle time point of the data strobe signal DQS and transmitted to the memory controller 710.

In a data (DATA) input operation of the memory device 720, when the data signal DQ including the data DATA is received from the memory controller 710, the memory interface circuitry 721 may receive the data strobe signal DQS, which toggles, along with the data DATA from the memory controller 710. The memory interface circuitry 721 may obtain the data DATA from the data signal DQ based on toggle time points of the data strobe signal DQS. For example, the memory interface circuitry 721 may sample the data signal DQ at rising and falling edges of the data strobe signal DQS and obtain the data DATA.

The memory interface circuitry 721 may transmit a ready/busy output signal nR/B to the memory controller 710 through the eighth pin P18. The memory interface circuitry 721 may transmit state information of the memory device 720 through the ready/busy output signal nR/B to the memory controller 710. When the memory device 720 is in a busy state (i.e., when operations are being performed in the memory device 720), the memory interface circuitry 721 may transmit a ready/busy output signal nR/B indicating the busy state to the memory controller 400. When the memory device 720 is in a ready state (i.e., when operations are not performed or completed in the memory device 720), the memory interface circuitry 721 may transmit a ready/busy output signal nR/B indicating the ready state to the memory controller 710. For example, while the memory device 720 is reading data DATA from the memory cell array 723 in response to a page read command, the memory interface circuitry 721 may transmit a ready/busy output signal nR/B indicating a busy state (e.g., a low level) to the memory controller 710. For example, while the memory device 720 is programming data DATA to the memory cell array 723 in response to a program command, the memory interface circuitry 721 may transmit a ready/busy output signal nR/B indicating the busy state to the memory controller 720.

The control logic circuitry 722 may control all operations of the memory device 720. The control logic circuitry 722 may receive the command/address CMD/ADDR obtained from the memory interface circuitry 721. The control logic circuitry 722 may generate control signals for controlling other components of the memory device 720 in response to the received command/address CMD/ADDR. For example, the control logic circuitry 721 may generate various control signals for programming data DATA to the memory cell array 723 or reading the data DATA from the memory cell array 723.

The memory cell array 723 may store the data DATA obtained from the memory interface circuitry 310, via the control of the control logic circuitry 722. The memory cell array 723 may output the stored data DATA to the memory interface circuitry 721 via the control of the control logic circuitry 722. The memory cell array 723 may include a plurality of memory cells. For example, the memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 710 may include first to eighth pins P21 to P28 and a controller interface circuitry 711. The first to eighth pins P21 to P28 may respectively correspond to the first to eighth pins P11 to P18 of the memory device 720. The controller interface circuitry 711 may transmit a chip enable signal nCE to the memory device 720 through the first pin P21. The controller interface circuitry 711 may transmit and receive signals to and from the memory device 720, which is selected by the chip enable signal nCE, through the second to eighth pins P22 to P28.

The controller interface circuitry 711 may transmit the command latch enable signal CLE, the address latch enable signal ALE, and the write enable signal nWE to the memory device 720 through the second to fourth pins P22 to P24. The controller interface circuitry 711 may transmit or receive the data signal DQ to and from the memory device 300 through the seventh pin P27. The controller interface circuitry 711 may transmit the data signal DQ including the command CMD or the address ADDR to the memory device 720 along with the write enable signal nWE, which toggles. The controller interface circuitry 711 may transmit the data signal DQ including the command CMD to the memory device 720 by transmitting a command latch enable signal CLE having an enable state. Also, the controller interface circuitry 711 may transmit the data signal DQ including the address ADDR to the memory device 720 by transmitting an address latch enable signal ALE having an enable state.

The controller interface circuitry 711 may transmit the read enable signal nRE to the memory device 720 through the fifth pin P25. The controller interface circuitry 711 may receive or transmit the data strobe signal DQS from or to the memory device 720 through the sixth pin P26.

In a data (DATA) output operation of the memory device 720, the controller interface circuitry 711 may generate a read enable signal nRE, which toggles, and transmit the read enable signal nRE to the memory device 720. For example, before outputting data DATA, the controller interface circuitry 711 may generate a read enable signal nRE, which is changed from a static state (e.g., a high level or a low level) to a toggling state. Thus, the memory device 720 may generate a data strobe signal DQS, which toggles, based on the read enable signal nRE. The controller interface circuitry 711 may receive the data signal DQ including the data DATA along with the data strobe signal DQS, which toggles, from the memory device 720. The controller interface circuitry 711 may obtain the data DATA from the data signal DQ based on a toggle time point of the data strobe signal DQS.

In a data (DATA) input operation of the memory device 720, the controller interface circuitry 711 may generate a data strobe signal DQS, which toggles. For example, before transmitting data DATA, the controller interface circuitry 711 may generate a data strobe signal DQS, which is changed from a static state (e.g., a high level or a low level) to a toggling state. The controller interface circuitry 711 may transmit the data signal DQ including the data DATA to the memory device 720 based on toggle time points of the data strobe signal DQS.

The controller interface circuitry 711 may receive a ready/busy output signal nR/B from the memory device 720 through the eighth pin P28. The controller interface circuitry 711 may determine state information of the memory device 720 based on the ready/busy output signal nR/B.

Although not shown in FIG. 14, when performing communication between the memory controller 710 and the memory device 720 according to embodiments, some pins shown in FIG. 14A may be omitted, or other types of pins may be added to the memory controller 710 and the memory device 720 respectively. As an example, at least some of various types of pins, such as a pin transmitting a write prohibition signal, a pin transmitting a signal for resetting the memory device 720, a pin transmitting a high voltage, and a test pin may be further provided.

Meanwhile, the uses of various pins shown in FIG. 14 may be set or changed during a training process between the memory controller 710 and the memory device 720. For example, a pin transmitting a write prohibition signal may be changed to a pin transmitting a reset signal, and this may be achieved through a negotiation process based on supportable functions of each of the memory controller 710 and the memory device 720.

In an embodiment, information related to the use of various pins may be stored in the memory device 720 as IDR data, and the value of at least some of the IDR data related to the use of the pins may be changed during a training process. Accordingly, IDR data related to the purpose of the pins may be defined as second IDR data in the embodiments, and reset and update operations may not be performed on the IDR data related to the purpose of the pins in the re-configuration operation. Also, the command CMD for controlling partial reset or super reset may be composed of a combination of signals provided through at least one pin shown in FIG. 14, and at least one IDR data from the memory device 720 may be provided to the memory controller 710 through at least one pin of, for example, a seventh pin P17.

Figure 15A:
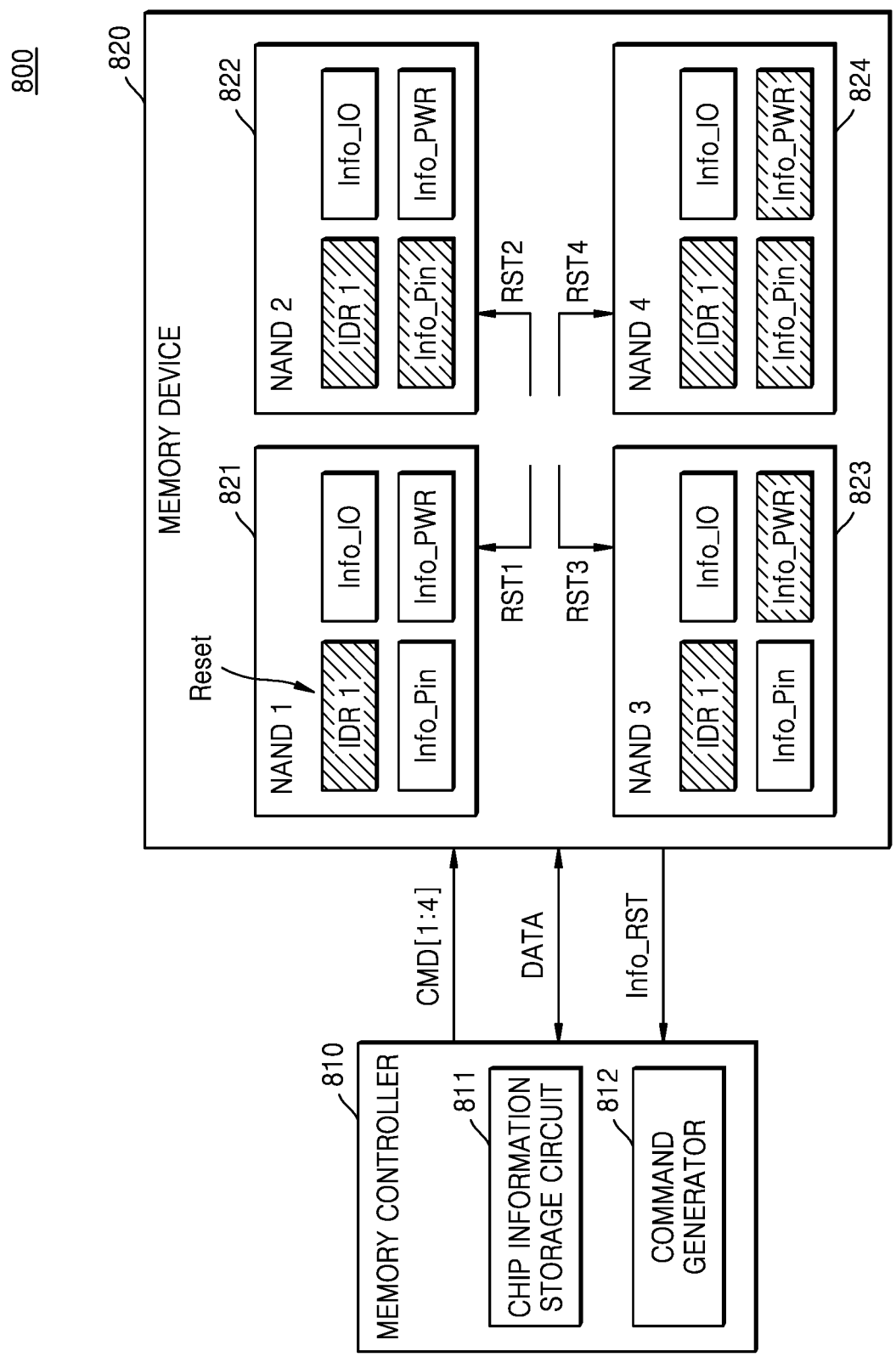

FIGS. 15A and 15B are diagrams illustrating various examples of performing a reset and update operation on a plurality of NAND chips. Referring to FIG. 15A, a memory system 800 may include a memory controller 810 and a memory device 820, and the memory controller 810 may include a chip information storage circuit 811 and a command generator 812. In addition, FIG. 15A briefly shows an example in which the memory device 820 includes a plurality of NAND chips (e.g., first to fourth NAND chips), and a case in which a setting data storage circuit provided in each of the first to fourth NAND chips 821 to 824 includes four storage regions is illustrated. In addition, the setting data storage circuit of each of the first to fourth NAND chips 821 to 824 may be reset by a corresponding reset control signal, and in FIG. 15A, for convenience of illustration, the first to fourth reset control signals RST1 to RST4 are shown outside the first to fourth NAND chips 821 to 824, but each reset control signal may be generated inside the NAND chips.

Meanwhile, the memory controller 810 may provide a command CMD to the first to fourth NAND chips 821 to 824 and communicate data DATA. As an example, commands provided to the first to fourth NAND chips 821 to 824 are shown as first to fourth commands CMD[1:4]. Also, in an embodiment, the first to fourth NAND chips 821 to 824 may provide, to the memory controller 810, chip information Info_chip indicating characteristics of chips related to IDR data on which a reset is performed in a partial reset operation and/or IDR data on which reset is not performed, and the memory controller 810 may store the chip information Info_chip in the chip information storage circuit 811.

FIG. 15B shows an example in which chip information for each of the first to fourth NAND chips 821 to 824 is stored in the chip information storage circuit 811. Referring to FIGS. 15A and 15B, first IDR data IDR 1 and at least one second IDR data may be defined according to the embodiments described above, and the second IDR data may be, for example, I/O setting information Info_IO, pin setting information Info_Pin and power setting information Info_PWR.

The memory controller 810 may determine a NAND chip to be reset, and may differently control a partial reset operation for each NAND chip based on information stored in the chip information storage circuit 811. For example, during a partial reset operation of the first NAND chip 821, only the first IDR data IDR 1 may be reset in response to a first reset control signal RST1, and the second IDR data may not be reset. Meanwhile, during a partial reset operation for the second NAND chip 822, only the first IDR data IDR 1 and the pin setting information Info_Pin may be reset in response to the second reset control signal RST2, and the I/O setting information Info_IO and the power setting information Info_PWR may not be reset. In addition, during a partial reset operation for the third NAND chip 823, only the first IDR data IDR 1 and power setting information Info_PWR may be reset in response to the third reset control signal RST3, and the I/O setting information Info_IO and the pin setting information Info_Pin may not be reset. In addition, during a partial reset operation for the fourth NAND chip 824, only the first IDR data IDR 1, the pin setting information Info_Pin, and the power setting information Info_PWR may be reset in response to the fourth reset control signal RST4, and the I/O setting information Info_IO may not be reset.

According to the above embodiment, the partial reset operations may be optimally performed for the respective NAND chips by adapting to the characteristics of the NAND chips. As an example, when the pin setting is not changed during the initial driving of the second NAND chip 822 or when IDR data related to the pin setting is stored in the setting data storage circuit without a change, the pin setting information Info_Pin may be reset during the partial reset operation of the second NAND chip 822. That is, various different settings may be made in relation to the operating environment for each NAND chip, and as the memory controller 810 includes related information, different types of IDR data may be reset and updated for each failed NAND chip.

In the example shown in FIGS. 15A and 15B, data on which a reset is not performed during the partial reset may be defined as second IDR data, and in this case, the pin setting information Info_Pin or the power setting information Info_PWR for each NAND chip may correspond to the first IDR data or the second IDR data. Alternatively, in an embodiment, according to the embodiment shown in FIGS. 15A and 15B, some of the second IDR data may be reset during the partial reset operation. In addition, although it is described that different partial reset operations are performed on the NAND chips in FIGS. 15A and 15B, embodiments may not be limited thereto. As an example, a plurality of dies may be included in a NAND chip, and different partial reset operations may be applied to the dies, respectively.

Figure 16:
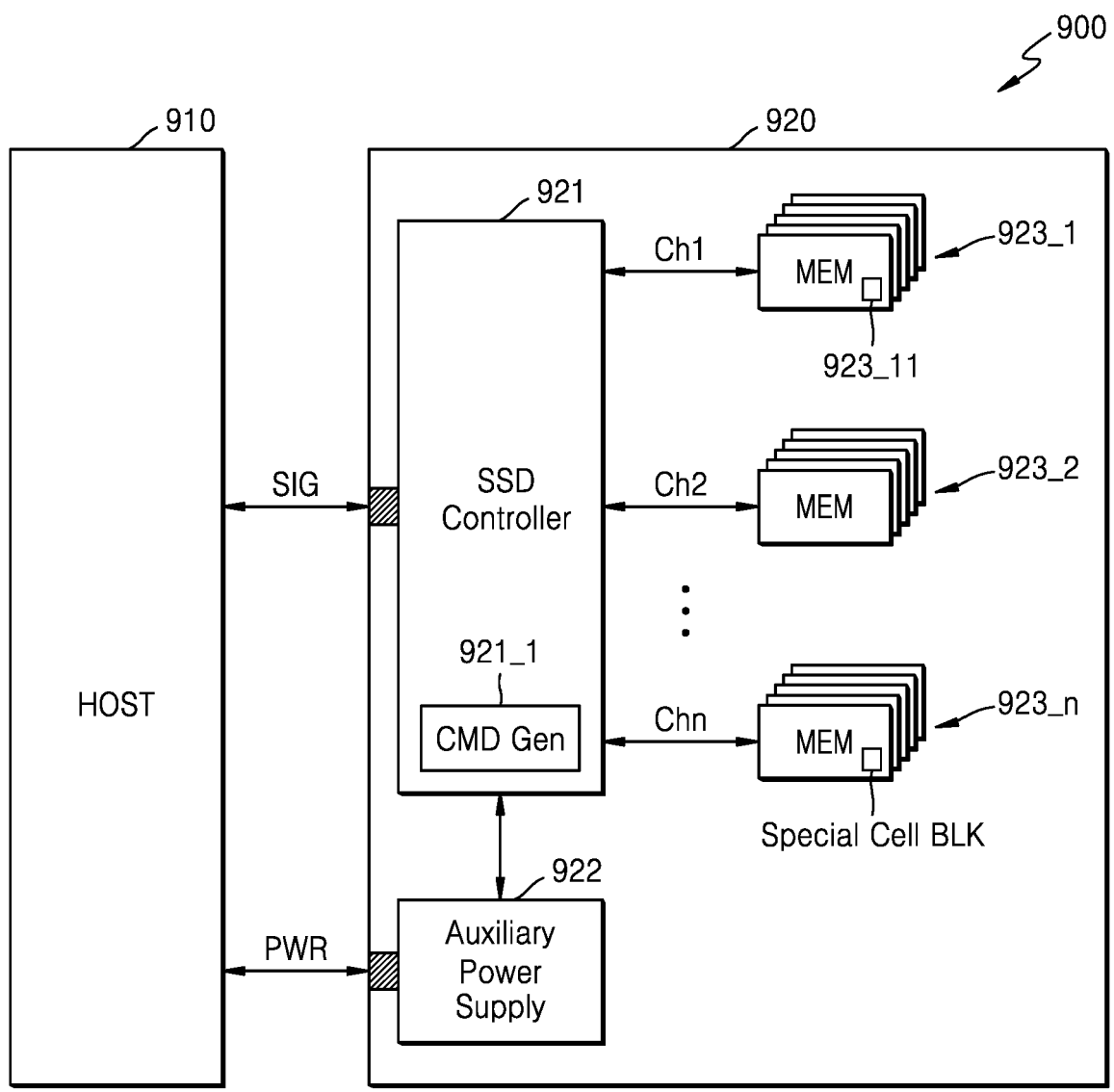
FIG. 16 is a block diagram illustrating an example of applying a memory device according to embodiments into a solid-state drive (SSD) system.

FIG. 16 is a block diagram illustrating an example of applying a memory device according to embodiments to an SSD system 900. Referring to FIG. 16, the SSD system 900 may include a host 910 and an SSD 920. The SSD 920 exchanges signals with the host 910 through a signal connector and receives power through a power connector. The SSD 920 may include an SSD controller 921, an auxiliary power supply 922, and memory devices 923_1 to 923_n. The memory devices 923_1 to 923_n may be vertically stacked NAND flash memory devices. Here, the SSD 920 may be implemented using the embodiments described above with reference to FIGS. 1 to 15. That is, the SSD controller 921 provided in the SSD 920 may include a command generator 921_1 that generates super/partial reset commands and entire/partial IDR commands. Also, each of the memory devices 923_1 to 923_n may include a plurality of cell blocks, at least one of the cell blocks may store IDR data, and each of the memory devices 923_1 to 923_n may include a setting data storage circuit for storing the first and second IDR data. Also, according to the embodiments shown in FIGS. 1 to 15, reset operations and IDR operations for a plurality of storage regions included in the setting data storage circuit may be controlled.

While the inventive concept has been particularly shown and described with reference to embodiments thereof, it will be understood that various changes in form and details may be made therein without departing from the spirit and scope of the following claims.

What is claimed is:

1. A memory device, comprising:
    a memory cell array having a plurality of cell blocks therein, including at least one cell block configured to store information data read (IDR) data related to setting an operating environment of the memory device;
    a setting data storage circuit including a plurality of storage regions in which the IDR data, which is read from the at least one cell block, is stored and a reset operation is independently controlled; and
    control logic configured to control at least one of a reset operation on the setting data storage circuit, and an IDR operation of updating the IDR data to the setting data storage circuit according to a decoding result of an external command, said control logic configured to selectively reset only some storage regions of the setting data storage circuit in response to a determination that the external command is a first reset command, but reset all storage regions of the setting data storage circuit in response to a determination that the external command is a second reset command,
    wherein the plurality of storage regions include first to N-th storage regions, which are configured to store different types of IDR data, where N is a positive integer greater than one.

2. The memory device of claim 1, wherein the IDR data includes first to N-th IDR data according to data types; and wherein the control logic is configured to selectively read some of the first to N-th IDR data in response to a determination that the external command is a first IDR command, but read all of the first to N-th IDR data in response to a determination that the external command is a second IDR command.

3. The memory device of claim 2, wherein the first to N-th storage regions respectively correspond to the first to N-th IDR data; and wherein, in response to the first IDR command, some of the IDR data selectively read from the first to N-th IDR data is updated to some corresponding storage regions among the first to N-th storage regions.

4. The memory device of claim 1, wherein input/output setting information for communication between the memory controller and the memory device is stored in at least one storage region that is not reset in response to the first reset command.

5. The memory device of claim 4, wherein at least one of power setting information related to a level of a power supply voltage provided from the memory controller, and pin setting information related to use of a pin for a plurality of pins provided in the memory device, is further stored in at least one storage region that is not reset in response to the first reset command.

6. The memory device of claim 1, wherein at least one of voltage trim information, bad block information, column repair information, and core optimization information is stored in at least one storage region that is reset in response to the first reset command.

7. The memory device of claim 1, wherein the memory device further includes a plurality of transfer paths disposed to be physically or electrically separated from each other with respect to the first to N-th storage regions and configured to transfer reset control signals to corresponding storage regions.

8. The memory device of claim 7, wherein the external command includes first to M-th reset commands for controlling a reset operation for the first to N-th storage regions, where M is a positive integer greater than one and less than N; and wherein storage regions that are not reset, among the first to N-th storage regions, are selected differently from each other according to decoding results of the first to M-th reset commands.

9. The memory device of claim 1, wherein the memory device includes a plurality of flash memory chips, and when a failure occurs in any one of the plurality of flash memory chips, only some of the plurality of storage regions in the failed flash memory chip are selectively reset.

10. The memory device of claim 1, wherein the memory device includes a plurality of flash memory chips, and when a failure occurs in any one of the plurality of flash memory chips, only some of the plurality of storage regions of each of the plurality of flash memory chips are selectively reset.

11. The memory device of claim 1, wherein the memory device includes first and second flash memory chips; and wherein a type of IDR data that is not reset in the first flash memory chip in response to the first reset command is different from a type of IDR data that is not reset in the second flash memory chip in response to the first reset command.

12. A method of operating a memory device, which includes a cell block configured to store information data read (IDR) data, which relates to setting of an operating environment and includes first and second IDR data related to different operating environments, said method comprising:

storing the first and second IDR data read from the cell block in first and second storage regions of a setting data storage circuit when the memory device is initially driven;

selectively reading the first IDR data from the cell block based on control from a memory controller when a failure occurs in the memory device;

updating the selectively read first IDR data to the first storage region;

receiving a first command from the memory controller; and selectively resetting only the first storage region, among the first and second storage regions, based on a decoding result of the first command, wherein the memory device communicates with the memory controller according to an operating environment based on the first IDR data updated to the first storage region and the second IDR data stored in the second storage region, during the initial driving.

13. The operating method of claim 12, wherein the second IDR data includes at least one piece of information selected from the group consisting of input/output speed information, on-die termination (ODT) information, pin setting information, power setting information, driver strength information, impedance calibration information, and duty cycle correction (DCC) training information.

14. The operating method of claim 12,
wherein the selectively read first IDR data is updated to the first storage region after the reset is completed.

15. The operating method of claim 14, further comprising:
outputting data read through a normal memory operation to the memory controller; and
wherein the first command is received from the memory controller when an uncorrectable error exists in the data read through the normal memory operation.

16. The operating method of claim 12, wherein, when an uncorrectable error exists in the data read from the memory device after updating the first IDR data to the first storage region, the first and second IDR data are read together and the first and second IDR data are updated to the first and second storage regions.

17. The operating method of claim 12,
wherein the memory device includes a plurality of flash memory chips, and each of the plurality of flash memory chips includes the setting data storage circuit for storing the first and second IDR data; and
wherein, when a failure occurs in any one of the plurality of flash memory chips, the memory device selectively updates the first IDR data of the failed flash memory chip.

18. A memory device comprising:
a memory cell array including a plurality of cell blocks, wherein at least one cell block is configured to store information data read (IDR) data related to setting an operating environment of the memory device;
a setting data storage circuit configured to store the IDR data read from the at least one cell block; and
control logic configured to control an IDR operation of updating the setting data storage circuit with the IDR data read from the memory cell array according to a decoding result of a command provided from a memory controller;
wherein the IDR data includes first to N-th IDR data related to different operating environments, where N is a positive integer greater than one;
wherein the first to N-th IDR data are stored in the setting data storage circuit when the memory device is initially driven; and
wherein during a resetting operation for the memory device, the control logic performs a control operation so that some of the first to N-th IDR data are selectively read from the cell block and updated to the setting data storage circuit.

19. The memory device of claim 18,
wherein the setting data storage circuit includes first to N-th storage regions respectively corresponding to the first to N-th IDR data;
wherein during the resetting operation, only storage regions corresponding to some IDR data selectively read from the first to N-th storage regions are selectively reset; and
wherein the some IDR data are updated to the setting data storage circuit after the reset is completed.

20. The memory device of claim 18, wherein IDR data that is not updated in the reset operation includes input/output setting information, so that during the reset operation, the memory device communicates with the memory controller according to an input/output interface previously set in a full differential mode.

* * * * *